United States Patent [19]
Itoh et al.

[11] Patent Number: 5,550,451
[45] Date of Patent: Aug. 27, 1996

[54] MICROCOMPUTER WITH BUILT-IN MOTOR CONTROL CIRCUIT

[75] Inventors: Mitsuhiro Itoh; Hideo Matsui, both of Itami, Japan

[73] Assignee: Mitsubishi Denki Kabushiki Kaisha, Tokyo, Japan

[21] Appl. No.: 475,478

[22] Filed: Jun. 7, 1995

Related U.S. Application Data

[63] Continuation-in-part of Ser. No. 337,417, Nov. 8, 1994, abandoned, which is a continuation of Ser. No. 58,062, May 10, 1993, abandoned.

[30] Foreign Application Priority Data

May 18, 1992 [JP] Japan ............... 4-124567

[51] Int. Cl.$^6$ .................. H02P 7/628; G06F 15/78
[52] U.S. Cl. .................. 318/811; 318/254
[58] Field of Search .................. 318/811, 254, 318/430, 431, 567, 599, 722, 732, 786, 800, 801, 810

[56] References Cited

U.S. PATENT DOCUMENTS

| | | | |
|---|---|---|---|
| 4,599,545 | 7/1986 | Moriki et al. | 318/599 X |
| 4,760,317 | 7/1988 | Hetzel et al. | 318/254 X |
| 4,873,473 | 10/1989 | Penn et al. | 318/814 |
| 4,924,158 | 5/1990 | Kelley et al. | 318/434 |
| 5,013,985 | 5/1991 | Itoh et al. | 318/558 |
| 5,053,690 | 10/1991 | Mutoh et al. | 318/811 |
| 5,221,881 | 6/1993 | Cameron | 318/254 |
| 5,274,317 | 12/1993 | Utley et al. | 318/802 |
| 5,294,877 | 3/1994 | Cameron | 318/809 |
| 5,298,841 | 3/1994 | Katayama et al. | 318/268 |
| 5,306,988 | 4/1994 | Carobolante et al. | 318/254 |
| 5,309,079 | 5/1994 | Takada | 318/811 |
| 5,453,922 | 9/1995 | Gleim | 318/254 X |

*Primary Examiner*—Bentsu Ro
*Attorney, Agent, or Firm*—Lowe, Price, LeBlanc & Becker

[57] ABSTRACT

A microcomputer with a built-in motor control circuit comprising a PWM generating circuit capable of automatically inverting a start level of PWM output or of changing the start level according to an optional preset pattern, an interruption request control circuit for controlling an interruption timing, and a multi-function reload register, is configured such that a start level content is inverted automatically at every period by setting a variable required for the conversion at a program executed on CPU when the start level content of the PWM output is inverted at every period, so as to make the setting unnecessary at every interruption.

6 Claims, 21 Drawing Sheets

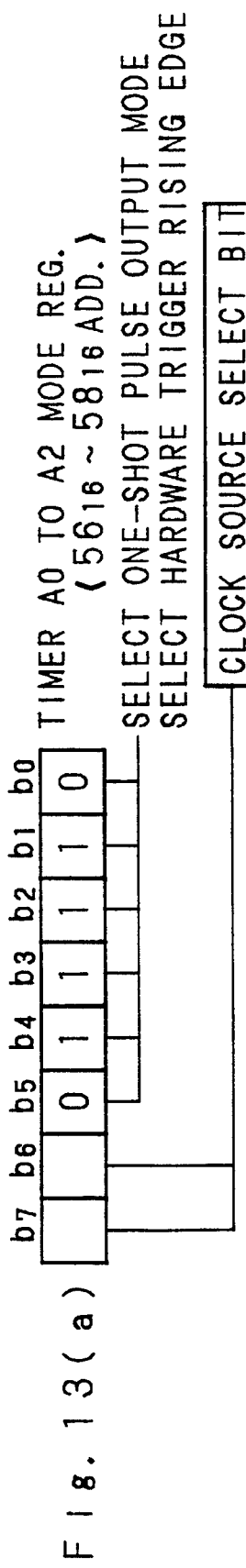
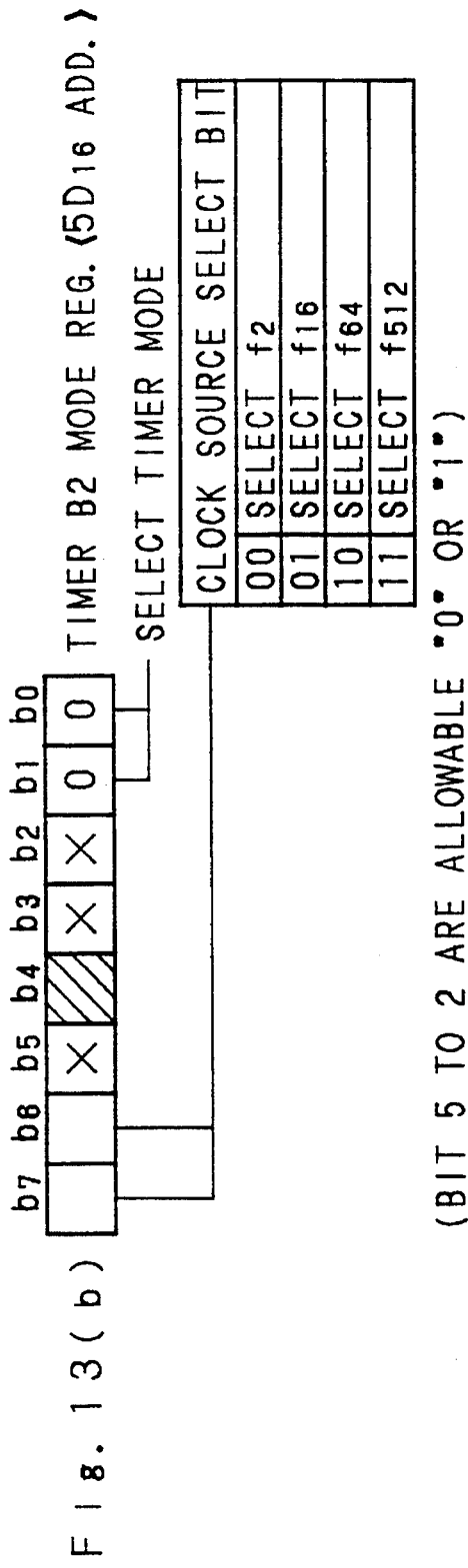
Fig. 13(a)
Fig. 13(b)

Fig. 18

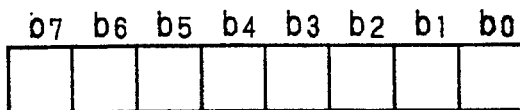

A/D MODE REG.

| ANALOG INPUT SELECT MODE | |
|---|---|
| 000 | SELECT AN0 |
| 001 | SELECT AN1 |
| 010 | SELECT AN2 |
| 011 | SELECT AN3 |
| 100 | SELECT AN4 |
| 101 | SELECT AN5 |
| 110 | SELECT AN6 |
| 111 | SELECT AN7 |

| A/D MODE SELECT BIT | |
|---|---|
| 00 | ONE SHOT MODE |
| 01 | REPEAT MODE |
| 10 | SINGLE SWEEP MODE |
| 11 | REPEAT SWEEP MODE/ REPEAT NEW SWEEP H·DE |

| TRIGGER SELECT MODE | |
|---|---|
| 0 | SOFT WARE TRIGGER (INTERNAL TRIGGER) |
| 1 | TRIGGER BY #ADTRG INPUT (EXTERNAL TRIGGER) |

| A/D CONVERSION START FLAG | |
|---|---|
| 0 | STOP A/D CONVERSION |
| 1 | START A/D CONVERSION |

| A/D CONVERSION FREQUENCY($\phi$ AD) SELECT FLAG | |
|---|---|
| 0 | f(XIN)/SELECT 8 |
| 1 | f(XIN)/SELECT 4 |

5,550,451

MICROCOMPUTER WITH BUILT-IN MOTOR CONTROL CIRCUIT

This application is a continuation in part of application Ser. No. 08/337,417 filed Nov. 8, 1994, which is a continuation in part of application Ser. No. 08/058,062 filed May 10, 1993, both abandoned.

BACKGROUND OF THE INVENTION

1. Field of the Invention

The present invention relates to a microcomputer with a built-in motor control circuit for controlling, mainly, a three-phase inverter motor.

2. Description of the Related Art

Conventionally, when controlling an AC motor, mainly, a three-phase inverter motor by utilizing a microcomputer, a configuration as shown in FIG. 1 and FIG. 2 was adopted.

FIG. 1 is a block diagram showing a circuit configuration for controlling the three-phase inverter motor.

In FIG. 1, symbol 501 designates a-microcomputer, in which a CPU, a ROM and a RAM which are memories, a timer, a clock oscillator and so on are built in. It is also possible to constitute the microcomputer 501 with a single chip.

Symbol 502 designates an additional circuit, which converts a PWM output waveform composed of a pulse width modulation waveform signal (herein after abbreviated as PWM) generated by the microcomputer 501 into an inverter output waveform. As a result, a three-phase inverter waveform composed of three-phases of U, #U, V, #V, W, #W (# designates an inverted signal) necessary for driving control of a motor is obtained, and this is given to the motor, not shown, as motor drive signals.

As a practical apparatus, as shown in FIG. 2, it is used as a motor control unit consisting of printed wiring board 503 onto which the microcomputer 501 and the additional circuit 502 are mounted.

However, when adopting the configuration as shown in FIG. 1, the additional circuit 502 is required besides the microcomputer 501, and when mounting on the printed wiring board 503 as shown in FIG. 2, it is problematic in that a mounting area becomes larger and susceptible to effects of external noises. Furthermore, since the additional circuit 502 including various components is required besides the microcomputer 501, the fact resulting in a high cost.

In view of such circumstances, the inventors have proposed the invention which has been disclosed in U.S. Pat. No. 5,013,985 (Japanese Patent Application Laid-Open No. 3-70475 (1991)).

In the invention disclosed in the U.S. Pat. No. 5,013,985, as the configuration is shown in a block diagram of FIG. 3, a CPU 501a, a RAM 501b, a ROM 501c, an oscillator 501d, a timer 501e, a motor control circuit 504 and so on are constituted on a chip as the microcomputer 501. The problems of large mounting area and the effects of external noises as seen in the above-mentioned conventional example are attempted to be solved by adopting such configuration.

A microcomputer for controlling an AC motor is disclosed in "FIND" Vol. 9 No. 2 (March 1991) issued by Fujitsu Limited. In the following, this microcomputer will be described as the conventional example.

FIG. 4 is a block diagram showing a configuration of the above-mentioned microcomputer as the conventional example.

In FIG. 4, reference symbol 1a designates a CPU (central processing unit), symbol 1b designates a RAM, symbol 1c designates a ROM, symbol 1d designates an oscillator, symbol 1e designates a general-purpose port, symbols 1f and 1g designate interruption-related control circuits, symbol 1h designates a watch dog timer, symbol 1i designates a timer unit, symbol 1j designates an 8-bit reload timer, symbol 1k designates a PWM timer module, symbol 11 designates an A/D converter, symbol 1m designates a UART, and symbol 1n designates an I/O serial extension interface, which are interconnected by an internal bus 1o and constituted on one chip as a one-chip microcomputer.

FIG. 5 is a block diagram showing a configuration of the above-mentioned timer unit 1i shown in FIG. 4.

In FIG. 5, symbols 2a to 2d designate output compare registers 0 to 3, symbols 2f to 2i designate compare buffer registers 0 to 3, symbol 2j designates a time counter, symbol 2k designates a timer control register, symbol 21 designates a timer interruption control register and symbol 2m designates a compare register.

FIG. 6 is a block diagram showing a configuration of the above-mentioned 8-bit reload timer 1j shown in FIG. 4.

This timer 1j functions as a short circuit check timer (hereinafter abbreviated as a dead time timer) as to be described later. In FIG. 6, symbol 3a designates a timer control register, symbol 3b designates a timer data buffer, symbol 3c designates flip-flops, symbol 3d designates port selectors, and symbol 3e designates an 8-bit reload timer.

FIG. 7 is a block diagram showing the dead time timer shown in FIG. 6 and the timer unit shown in FIG. 5 in combination.

In FIG. 7, symbol 4a on the timer unit side designates a 16-bit timer (corresponding to the timer counter 2j in FIG. 5), symbol 4b designates a U-phase compare buffer (corresponding to the compare buffer register 0 2f in FIG. 5), symbol 4c designates a V-phase compare buffer (corresponding to the compare buffer register 1 2g in FIG. 5), symbol 4d designates a W-phase compare buffer (corresponding to the compare buffer register 2 2h in FIG. 5), symbol 4e designates a period setting compare register (corresponding to the compare buffer register 3 2i in FIG. 5), symbols 4f to 4i designate output compare registers 0 to 3 (corresponding to the output compare registers 0 2a to 3 2d in FIG. 5), symbol 4j designates a data buffer and symbol 4o designates a compare register (corresponding to the compare register 2m in FIG. 5).

Symbol 4k on the dead time timer side designates a timer data buffer (corresponding to the timer data buffer 3b in FIG. 6), symbol 41 designates a dead time timer (corresponding to the 8-bit reload timer in FIG. 6), symbol 4m designates flip-flops (corresponding to 3c in FIG. 6), and symbol 4n designates port selectors (corresponding to 3d in FIG. 6).

In FIG. 7, symbols RT00 to RT05 designate output ports of respective phases.

FIG. 8 is a block diagram showing a configuration of the above-mentioned A/D converter 11 shown in FIG. 4. In FIG. 8, symbol 13a designates a selector, symbol 13b designates an A/D mode register, symbol 13c designates a comparator, symbol 13d designates a resistance ladder, symbol 13e designates an A/D conversion data buffer and symbol 13f designates a decoder.

Next, the operation of the conventional microcomputer for AC motor control having the aforementioned configuration is described.

First, a PWM period is set in the period setting compare register 4e (compare buffer register 3 2i). The content set in the period setting compare register 4*e* (compare buffer register 3 2*i*) is transferred to the output compare register 3 4*i* (output compare register 3 2*d*) when the content of the timer 4*a* (timer counter 2*j*) becomes "0000H" (H represents a hexadecimal digit). At the same time, when the content of the timer 4*a* (timer counter 2*j*) becomes "0000H", interruption is produced by the CPU 1*a*, and by the interruption processing, data of the period setting compare register 4*e* (compare buffer register 3 2*i*) is updated.

Meanwhile, a variation timing of the PWM waveform is set in the U-phase compare buffer 4*b* (compare buffer register 0 2*f*). The content set in the U-phase compare buffer 4*b* (compare buffer register 0 2*f*) is transferred to and held in the output compare register 3 4*i* (output compare register 0 2*a*), when the content of the timer 4*a* (timer counter 2*j*) becomes "0000H". Then, when a value of the timer 4*a* (timer counter 2*j*) and a value held by the output compare register 3 4*i* (output compare register 0 2*a*) are coincided, output levels of the corresponding ports, in this case the output port RT00 for the U-phase and the output port RT03 for the #U-phase, are inverted.

As data used by these compare buffer registers, data obtained by the A/D converter 11 and measuring timers (timer unit 1*i* etc.) built in the microcomputer are frequently used.

The A/D converter 11 converts analog input values from the outside into digital values for use as compare data of register values of the compare buffer registers 2*f*, 2*g*, 2*h*, 2*i* and so on or operation data for obtaining the register values.

As the operation of the conventional A/D converter, as shown in FIG. 8, in the case of A/D conversion of five inputs of analog input terminals AN0 to AN4, with respect to analog input information, the analog input terminals AN0 to AN4 were equally sampled repetitively in sequence as shown in a schematic diagram of FIG. 9, regardless of necessary frequencies of the sampling period.

Since the conventional microcomputer with built-in motor control circuit is constituted as aforementioned, in the case of changing the content of start level of the PWM output waveform optionally at every period, or in the case of changing the frequency and the like of the timer data or clock, usually variables must be rewritten by the interruption of the programs executed on the CPU. Thus, when the data are rewritten, a heavy burden is imposed on the CPU. In the case of controlling the high frequency inverter waveform, there is a possibility that the CPU processing speed is not enough and the data can not be updated in real time.

Also, in the A/D converter used in the conventional microcomputer with built-in motor control circuit, it is not operated so as to change the sampling period responsive to necessary frequencies with respect to respective analog input information, and hence, unnecessary samplings are interposed and the sampling time of the A/D conversion is prolonged as a whole.

In the case of using the A/D conversion value thus obtained in PWM output data and the like, since the sampling frequency of the A/D conversion is constant regardless of the necessary frequencies, there is a possibility that the data can not be updated in time.

SUMMARY OF THE INVENTION

The present invention has been devised in view of the aforementioned problems, therefore it is an object thereof to set a necessary variable by a program executed on a CPU, when the content of start level of a PWM output waveform is inverted at every period, so as to invert the start level content automatically at every period so that settings at every interruption are not necessary. Furthermore, it is another object to provide a microcomputer with built-in motor control circuit, whereby, when changing timer data on clock frequencies though usually the variable is rewritten by the interruption processing of the program executed on the CPU, the data which is rewritten at every interruption processings can be rewritten at every two processings.

It is still another object to provide a microcomputer with built-in motor control circuit, whereby, in the case of considering an applied example, though there may be the case that on the contrary, the data is not necessary to be rewritten by the interruption processing, the interruption timing control is possible so as to be controllable even in such cases.

It is a further object to provide a microcomputer with built-in motor control circuit, whereby, in the A/D converter, with respect to analog input information, the sampling period can be changed responsive to necessary frequencies of the respective information.

The microcomputer with built-in motor control circuit according to the present invention is constituted, as additional functions, by, a PWM generating circuit capable of inverting a start level of a PWM output automatically, or changing the start level by any set pattern, an interruption request control circuit for controlling an interruption timing, and multi-function reload registers.

Also, it is so constituted that, in the A/D converter, plural kinds of sampling periods can be set with respect to analog input information.

Furthermore, it is so constituted that, a load imposed on the CPU by the timer data setting at interruption can be made zero by adding a DMAC (Direct Memory Access Controller).

In the microcomputer with built-in motor control circuit of the present invention, rising edge generating means of the timer against respective phases of the motor control signal outputs the rising edge pulse by the clock from clock generating means, and on the bases of the rising edge pulse, three-phase inverter waveform generating timers generate the output. Next, the register, whose predetermined value is set by the CPU, decides the start level of the three-phase inverter waveform generating timer, from AND operation of the rising edge pulse and the start level, a start set signal is obtained, and from the start level set signal and the output pulses the three-phase inverter waveform is generated by a flip-flop circuit. At this time, the start level is inverted at every rising edge pulse.

In the three-phase inverter motor controller built-in microcomputer in the present invention, though the interruption is generated when the rising edge generating means outputs the rising edge pulse by the clock from the clock generating means, when generating the interruption, the interruption generating timing is controlled at every rising edge pulse, at every two times or at every three times.

Meanwhile, in the case of data setting at triangular wave modulation of the three-phase inverter PWM waveform, the three-phase inverter PWM waveform period corresponds to two periods of the microcomputer PWM. In this case, PWM data of the microcomputer corresponding to the triangular wave modulation of the three-phase inverter PWM waveform are so set, that the first period data and the second period data are in symmetry with respect to the PWM period. For example, when the period at the time of triangular wave modulation of the three-phase inverter PWM waveform is 100, the PWM period of the microcomputer is 50, and when the first period PWM data is set to 10, the second period PWM data is set to 40.

In the case of changing timer data and the like for outputting the PWM waveform requiring such a method, though conventionally when data is up-dated by one interruption processing, only data of next period was set, in the microcomputer with built-in motor control circuit of the present invention, data of two periods can be set at the same time by one interruption processing by adding the reload register. Also, by adding an inverting function of the set data, object data can be set for the period by one data setting.

By setting the first period data and adding a circuit which subtracts the first period data from the PWM period data to calculate second period data by using the reload register, object data can be set for the period at once.

Furthermore, in the A/D converter of the microcomputer with built-in motor control circuit of the present invention, a selector and a decoder are so improved that plural kinds of sampling periods can be corresponded with respect to analog input information. And hence, since the decoder selects the analog input terminal at the sampling period of two kinds set by the register, for example, when conducting A/D conversion of analog input terminals AN0 to AN4, in which the analog input terminals AN0, AN1 are used frequently and the analog input terminals AN3 to AN4 are used rarely, the A/D conversion can be conducted on the analog input terminals AN0 to AN4 in order as shown in a schematic diagram in FIG. 10.

The above and further objects and features of the invention will more fully be apparent from the following detailed description with accompanying drawings.

BRIEF DESCRIPTION OF THE DRAWINGS

FIG. 13(a) is a schematic diagram showing a configuration of a timer mode register for one-shot timers, FIG. 13(b) a schematic diagram showing a configuration of a timer mode register for a period setting timer, FIG. 18 is a schematic diagram showing a configuration of an A/D mode register and a set state of a sweep terminal setting bit.

DESCRIPTION OF THE PREFERRED EMBODIMENTS

In the following, the present invention is described in detail on the bases of the drawings showing its embodiments.

Figure 11:
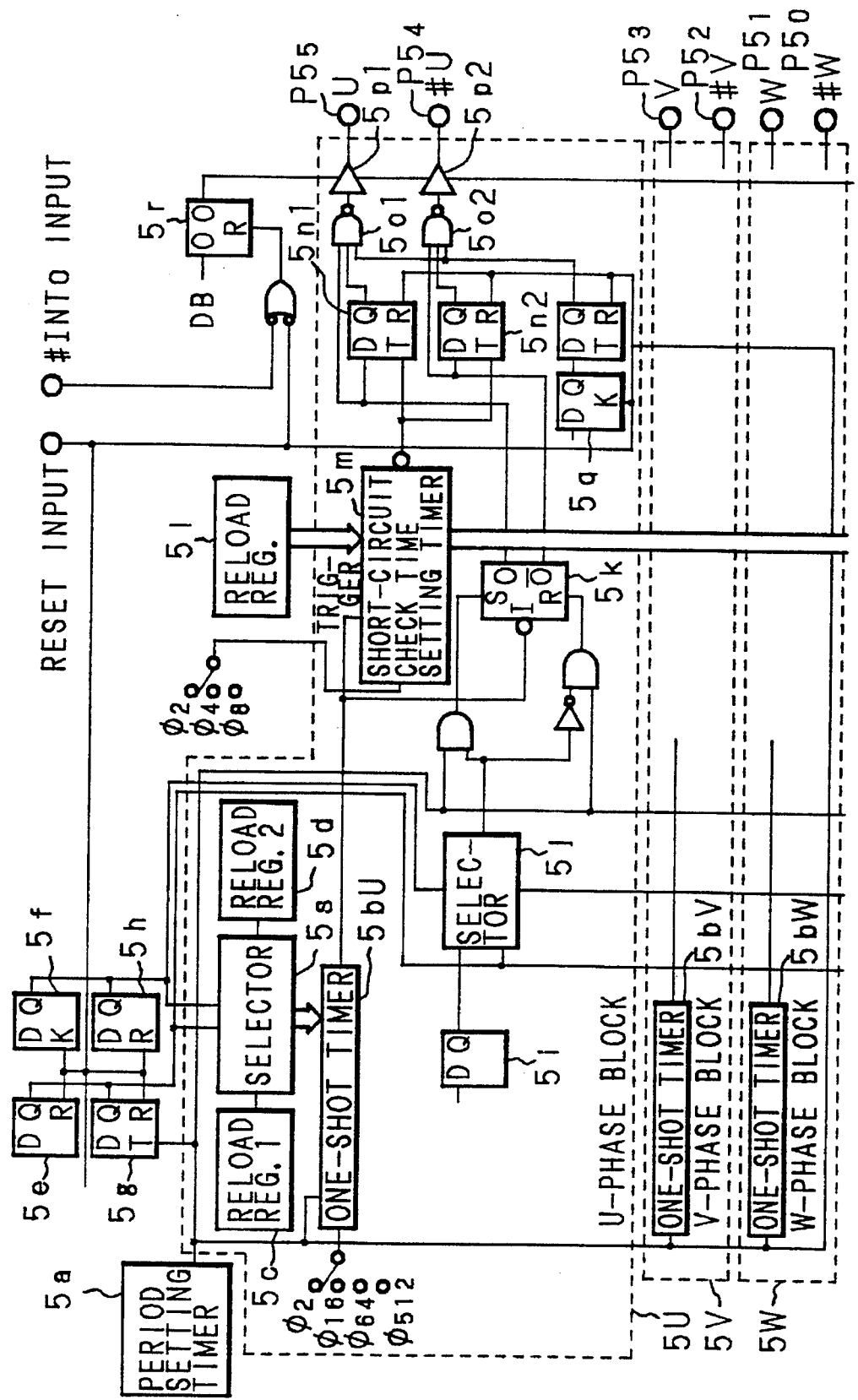
FIG. 11 is a block diagram showing a configuration of a three-phase waveform generating circuit which is an essential portion of a microcomputer with built-in motor control circuit of the present invention.

First, the output operation of a PWM waveform of a three-phase inverter of one embodiment of a microcomputer with built-in motor control circuit of the present invention is described with reference to FIG. 11. FIG. 11 is a block diagram showing a configuration of a three-phase waveform generating circuit which is an essential portion of the microcomputer with built-in motor control circuit of the present invention.

In FIG. 11, symbol 5U designates a U-phase block for generating a U-phase waveform, symbol 5V designates a V-phase block for generating a V-phase waveform and symbol 5W designates a W-phase block for generating a W-phase waveform, and basically, they all have a same configuration. And hence, only a specific internal configuration of the U-shape block 5U is shown in FIG. 11.

In FIG. 11, symbol 5a designates a period setting timer, and symbol 5bU designates a one-shot timer for U-phase which outputs pulses by a signal outputted from the period setting timer 5a as a trigger. In the V-phase block 5V and the W-phase block 5W, a one-shot timer 5bV for V-phase and a one-shot timer 5bW for W-phase having the same configuration as the one-shot timer 5bU for U-phase are included respectively.

Symbol 5c designates a reload register 1 for one-shot timer 5bU and symbol 5d designates a reload register 2 for one-shot timer 5bU. Symbol 5e designates an interruption valid polarity setting flip-flop, and an interruption valid polarity bit is inputted to its D-input terminal. Symbol 5f designates an interruption interval setting flip-flop, and an interruption interval setting bit is inputted to its D-input terminal. Symbol 5g designates an output polarity selecting flip-flop, and an output polarity selecting bit is inputted to its D-terminal. Symbol 5h designates an automatic three-phase mode setting flip-flop, and an automatic three-phase mode setting bit is inputted to its D-input terminal.

Symbol 5i designates an output polarity setting flip-flop, symbol 5j designates an output polarity selector, symbol 5k designates an output polarity setting toggle flip-flop, symbol 5l designates a reload register for short-circuit check time setting timer, symbol 5m designates a short-circuit check time setting timer (dead time timer), symbol 5n designates a dead time flip-flop, symbols 5o1 and 5o2 designate logic circuits, symbols 5p1 and 5p2 designate output buffers, symbol 5q designates an "H" level output setting flip-flop, symbol 5r designates an output buffer control flip-flop and symbol 5s designates a selector which selectively connects the reload registers 5c and 5d to the one-shot timer 5bU.

Figure 12:
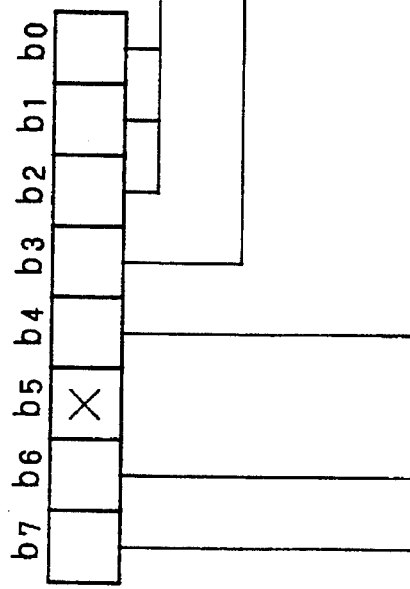
FIG. 12 is a schematic diagram showing a bit configuration of a waveform output mode register.

FIG. 12 is a schematic diagram showing a bit configuration of the waveform output register.

This waveform output mode register is constituted by 8 bits from bits b0 to b7, among which 3 bits of bits b2, b1 and b0 are set to "100" in the three-phase waveform mode. The bit b3 is given to the flip-flop 5g as an initial value of an automatic output polarity select bit. Specifically, when the bit b3 is "0", a positive polarity is set and when the bit b3 is "1", a negative polarity is set.

The bit b4 is given to the flip-flop 5h as a set value of an automatic three-phase mode select bit. Specifically, when the bit b4 is "0", a three-phase mode is set, and when the bit b4 is "1", an automatic mode is set.

The bit b6 sets a trigger of the short-circuit check time setting timer 5m. Specifically, when the bit b6 is "0", both edges of one-shot pulses of the one-shot timers 5bU, 5bV and 5bW of respective phase blocks 5U, 5V and 5W are selected, and when the bit b6 is "1", falling edges of one-shot pulses of the one-shot timers 5bU, 5bV and 5bW are selected.

Meanwhile, the bit b7 sets an initial output value of the output buffer controlling flip-flop 5r. Specifically, when the bit b7 is "0", a waveform output from the output buffer controlling flip-flop 5r is inhibited and when the bit b7 is "1", it is permitted.

By such waveform output mode register, the three-phase waveform mode, which uses four timers or the one-shot timers 5bU, 5bV and 5bW for respective phases and the period setting timer 5a, is selected.

The bit b5 is not defined.

In the three-phase waveform output mode selected by the aforementioned waveform output mode register, the timer mode register is set as shown in a schematic diagram in FIG. 13. That is, as shown in FIG. 13(a), the one-shot timers 5bU, 5bV and 5bW set the external trigger of the one-shot pulse mode to the rising edge valid state, and as shown in FIG. 13(b), the period setting timer 5a set to the timer mode by respective timer mode registers.

In the circuit having the configuration shown in a block diagram of FIG. 11, in the three-phase waveform output mode, six waveforms of positive-phase waveform (U-phase, V-phase, W-phase) and negative-phase waveforms (#U-phase, #V-phase, #W-phase) are outputted in "L" level active, from ports $P5_5$, $P5_4$ of a U-phase block 5U, ports $P5_3$, $P5_2$ of a V-phase block 5V and ports P51, P50 of a W-phase block 5W.

Among the timers used in the three-phase waveform output mode, the one-shot timer 5bU controls the U-phase and #U-phase waveforms, the one-shot timer 5bV controls the V-phase and #V phase waveforms and the one-shot timer 5bW controls the W-phase and #W-phase waveforms, and one-shot pulse output periods of the one-shot timers 5bU, 5bV and 5bW are controlled by the period setting timer 5a.

In the waveform output, a short-circuit check time is set so that "L" levels of the three-phase waveform outputs (U-phase, V-phase, W-phase) do not overlap with "L" levels of the negative-phase waveform outputs (#U-phase, #V-phase, #W-phase). The short-circuit check time is set by three short-circuit check time setting timers of 8-bit configuration respectively included in the phase blocks, using the reload register 51 in common (In FIG. 11, though only the short-circuit check time setting timer 5m of the U-phase block 5U is shown, the same short-circuit check time setting timers as the short-circuit check time setting timer 5m are included in the V-phase block 5V and the W-phase block 5W). The short-circuit check time setting timer 5m operates as the one-shot timer.

Either the rising edge and falling edge of the one-shot pulses of the one-shot timers 5bU, 5bV and 5bW, or only the falling edges thereof can be selected as a start trigger. This selection is conducted by the bit b6 of the waveform output mode register as shown in FIG. 12, and when the bit b6 is "0", the rising edge and falling edge serve as the start trigger, and when the bit b6 is "1" only the falling edges serve as the trigger.

Figure 14:
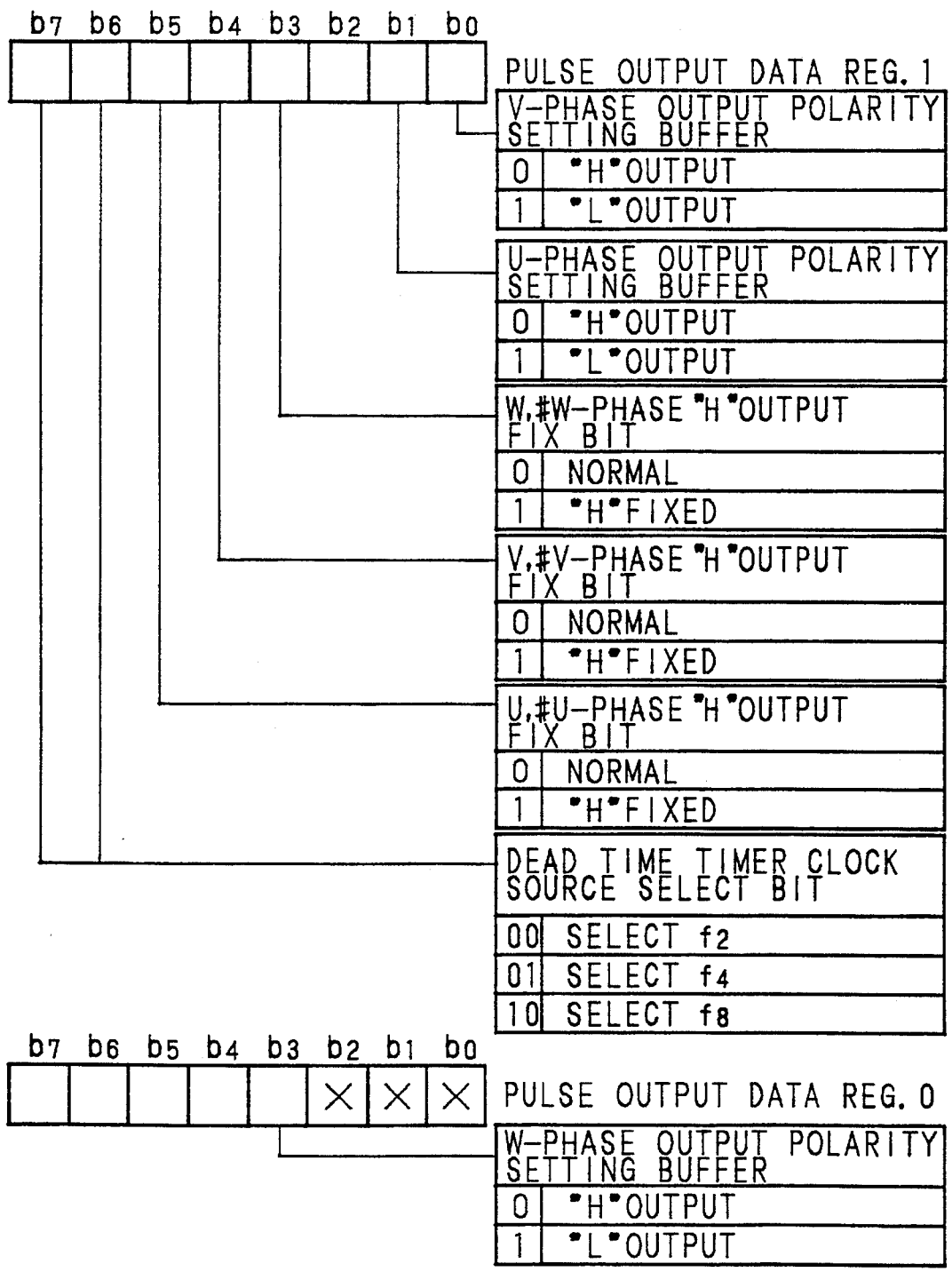
FIG. 14 is a schematic diagram showing a configuration of a pulse output data register and the content at a three-phase mode.

The short-circuit check time setting timer 5m is configured such that, as shown in FIG. 14, a count source is set by the bits b6, b7 of the pulse output data register 0. When the bits b6, b7 are "00", f2 (two-divided clock of original oscillation) is selected, when "01", f4 (four-divided clock of original oscillation) is selected and when "10", f8 (eight-divided clock of original oscillation) is selected.

When a value is written into the short-circuit check time setting timer 5m, this value is written into the reload register 51 commonly used by the short-circuit check time setting timer 5m and the like of the respective phase blocks 5U, 5V and 5W. When the start trigger is given from the one-shot timer 5bU (5bV, 5bW) in the block 5U (5V, 5W), the short-circuit check time setting timer 5m loads the value held by the reload register 51 to the built-in counter, and counts down by the count source set by the timer mode register.

The short-circuit check time setting timers can also receive the trigger again before the previous operation by the trigger is finished. In this case, after the content of the reload register 51 is transferred to the short-circuit check time setting timer 5m by the trigger, its value is counted down.

Since the short-circuit check time setting timer 5m operates as the one-shot pulse timer, the pulse output and down count are started when the trigger is given, and when the content becomes "0000H" the pulse output is finished and the operation is stopped, standing by till the next trigger is given.

An output polarity of the three-phase waveform is decided by the output polarity setting toggle flip-flop 5k. When the content of the output polarity setting toggle flip-flop 5k is "0", a positive-phase waveform of the three-phase waveform outputs an "H" level, and when "1", it outputs an "L" level (the three-phase waveform output is outputted in negative logic).

The output polarity setting toggle flip-flop 5k includes output polarity setting buffers respectively corresponding to the U-phase, V-phase and W-phase shown in FIG. 14, and at the time-point where the counter content of the period setting timer 5a becomes "0000H", the contents of the output polarity setting buffers are set in the output polarity setting toggle flip-flop 5k.

Figure 15:
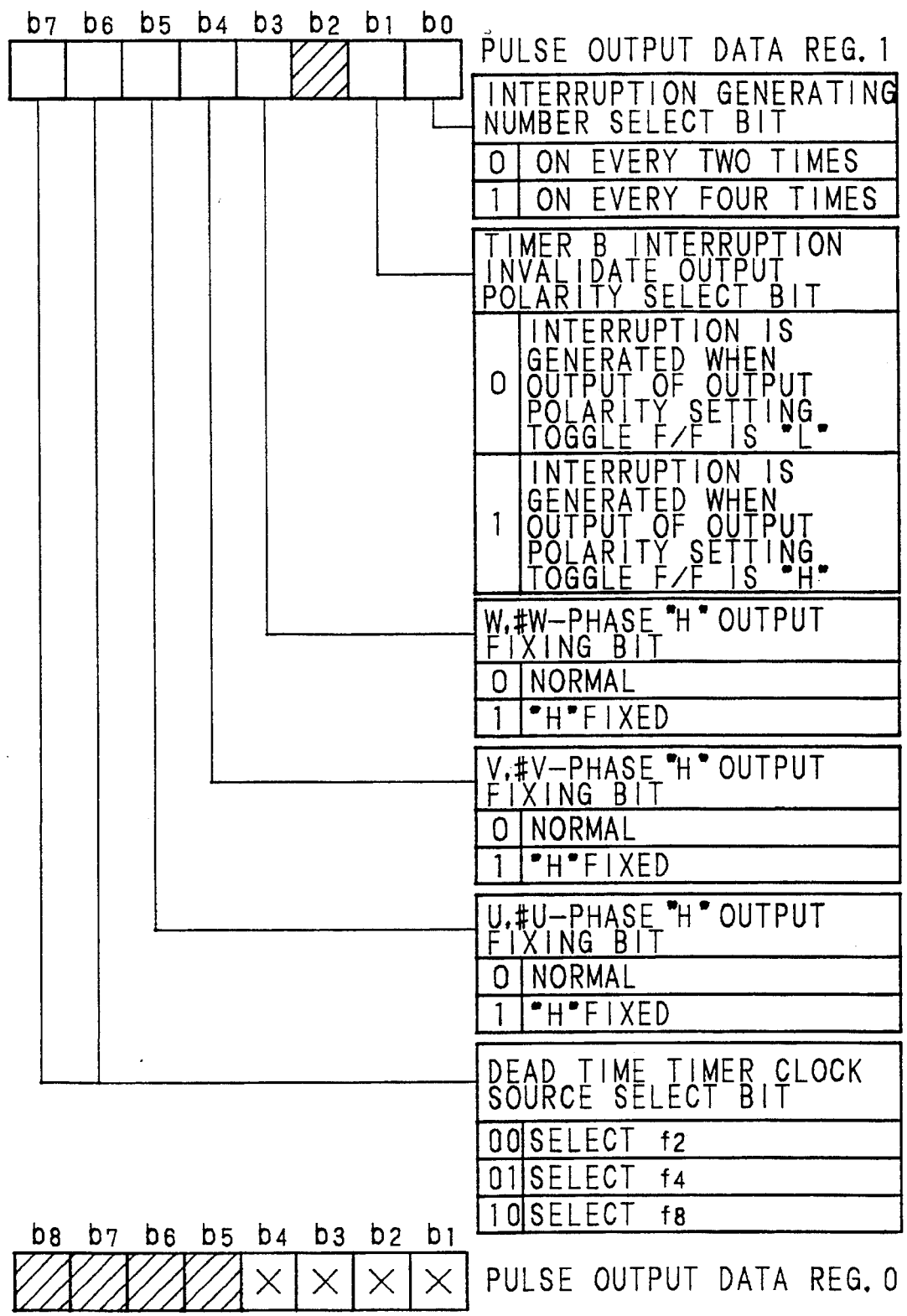
FIG. 15 is a schematic diagram showing a configuration of a pulse output data register and the content at an automatic three-phase mode.

When the content of the bit b4 (automatic three-phase mode select bit) of the waveform output mode register shown in FIG. 12 is made "1", an automatic mode is set. In this case, the output polarity setting buffers corresponding to the U-phase, V-phase and W-phase shown in FIG. 14 are nullified, and the pulse output data registers 1, 0 are in the bit configuration as shown in FIG. 15.

When the automatic mode is set, at the time point where the counter content of the period setting timer 5a becomes "0000H", the content of the automatic output polarity setting flip-flop 5g of the bit b3 of the waveform output mode register shown in FIG. 12 is inverted, and the content of the inverted automatic output polarity setting flip-flop 5g is set in the output polarity setting toggle flip-flop 5k corresponding to the U-phase, V-phase and W-phase. Thereafter, the polarity of the content of the output polarity setting toggle flip-flop 5k is inverted every time when the one-shot pulses of the timers (one-shot timers 5bU, 5bV, 5bW) corresponding to the phase blocks 5U, 5V and 5W are finished.

Figure 16:
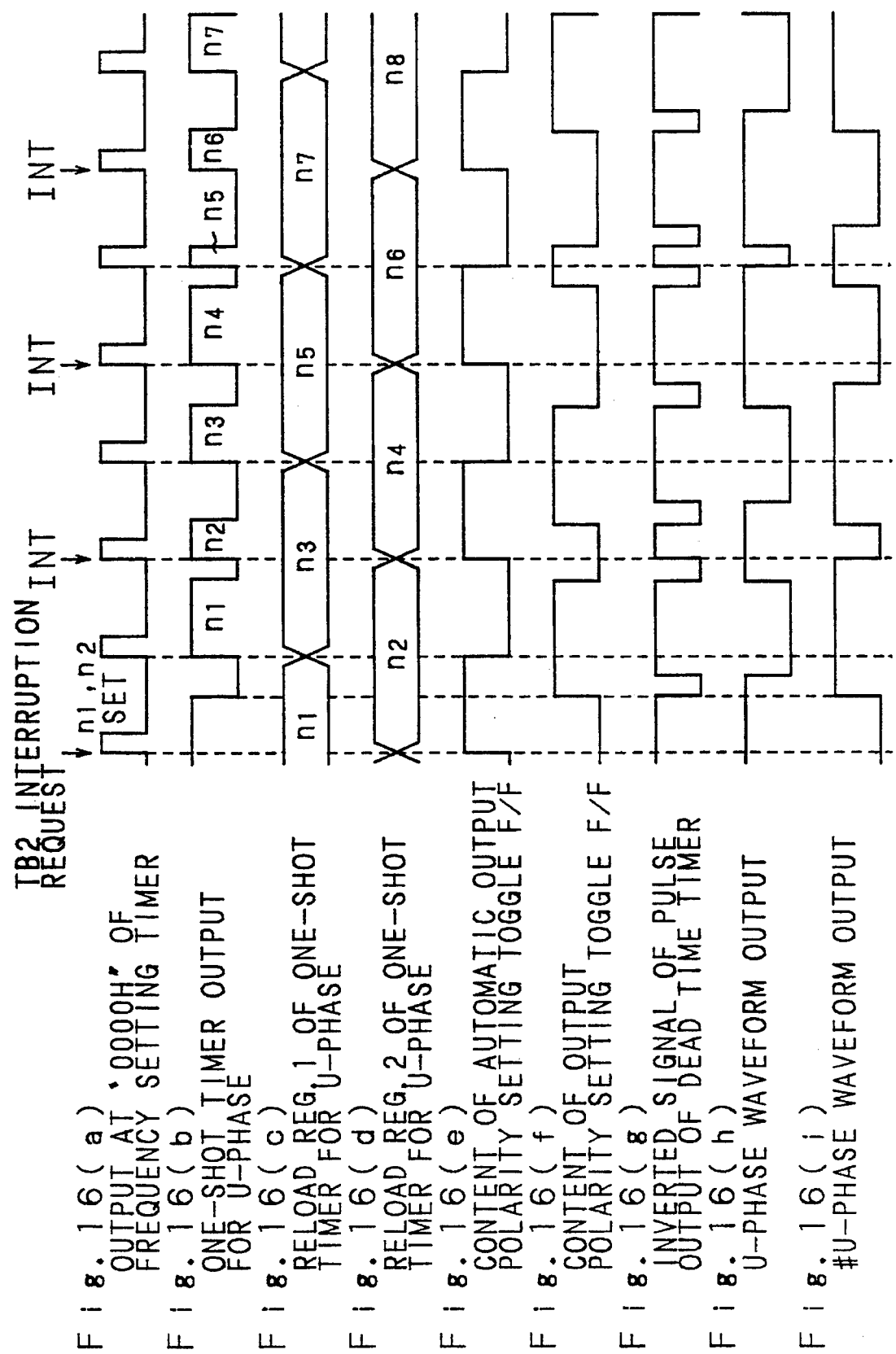
FIG. 16(a) is waveform diagram showing output at "0000H" of frequency setting timer for a U-phase waveform output as an example of the three-phase waveform output at an automatic mode.
FIG. 16(b) is waveform diagram showing one-shot timer output for a U-phase waveform output as an example of the three-phase waveform output at an automatic mode.
FIG. 16(c) is waveform diagram showing content of reload register 1 of one-shot timer for a U-phase waveform output as an example of the three-phase waveform output at an automatic mode.
FIG. 16(d) is waveform diagram showing content of reload register 2 of one-shot timer for a U-phase waveform output as an example of the three-phase waveform output at an automatic mode.
FIG. 16(e) is waveform diagram showing content of automatic output polarity setting toggle flip-flop for a U-phase waveform output as an example of the three-phase waveform output at an automatic mode.
FIG. 16(f) is waveform diagram showing content of output polarity setting toggle flip-flop for a U-phase waveform output as an example of the three-phase waveform output at an automatic mode.
FIG. 16(g) is waveform diagram showing inverted signal of pulse output of dead time timer for a U-phase waveform output as an example of the three-phase waveform output at an automatic mode.
FIG. 16(h) is waveform diagram showing U-phase waveform output as an example of the three-phase waveform output at an automatic mode.
FIG. 16(i) is waveform diagram showing #U-phase waveform output as an example of the three-phase waveform output at an automatic mode.

Next, the waveform output operation is described with reference to waveform diagrams of FIG. 16 showing an example of U-phase waveform output at the automatic mode.

At the automatic mode, as shown in FIG. 16(c) and FIG. 16(d), by setting data simultaneously in the reload register 1 5c and the reload register 2 5d of the one-shot timer 5bU, the data can be transferred to the one-shot timer 5bU alternately from the reload register 15c and the reload register 2 5d by the selector 5s, when the content of the one-shot timer 5bU becomes "0000H".

When "1" is written into the bit b5 of the waveform output mode register to operate the one-shot timer 5bU, the three-phase waveform output mode is operated. As shown in FIG. 16(a) and FIG. 16(b), when the counter content of the one-shot timer 5bU becomes "0000H", the register content of the one-shot timer 5bU is transferred to the one-shot timer 5bU to start the one-shot pulse output.

At this time point, as shown in FIG. 16(e) and FIG. 16(f), the content (in this case "0") of the automatic output polarity setting flip-flop 5g is set in the output polarity setting toggle flip-flop 5k.

When the one-shot pulse output of the one-shot timer 5bU is finished, as shown in FIG. 16(f), simultaneously with the content of the output polarity setting toggle flip-flop 5k inverting from "0" to "1", as shown in FIG. 16(g), a one-shot pulse of the 8-bit short-circuit check time setting timer (dead time timer) 5m which sets the time, in which "L" levels of the U-phase waveform and its negative phase #U-phase waveform do not overlap, is outputted.

In this case, as shown in FIG. 16(h), the U-phase waveform output started from the "H" level is outputted at the "H" level till the one-shot pulse output of the short-circuit check time setting timer 5m is finished, even when the content of the output polarity setting toggle flip-flop 5k is inverted from "0" to "1" by the one-shot pulse output of the one-shot timer 5bU.

When the one-shot pulse-output of the short-circuit check time setting timer 5m is finished, output "1" of the output polarity setting toggle flip-flop 5k inverted already becomes valid, and the U-phase waveform changes to the "L" level.

Thereafter, when the counter content of the one-shot timer 5bU becomes "0000H", the content of the reload register 2 5d of the one shot timer 5bU is transferred to the one-shot timer 5bU to start the one-shot pulse output. Simultaneously, the content of the automatic output polarity setting flip-flop 5g is inverted (in this case "1"), and the inverted content is set in the output polarity setting toggle flip-flop 5k and the U-phase waveform output remains at the "L" level.

When the one-shot pulse output of the one-shot timer 5bU is finished, simultaneously with the content of the output polarity setting toggle flip-flop 5k inverting from "1" to "0", the one-shot pulse output of the short-circuit check time setting timer 5m is started.

An output level of the U-phase waveform changes from "L" to "H" without waiting the end of one-shot pulse output of the short-circuit check time setting timer 5m, when the content of the output polarity setting toggle flip-flop 5k changes from "1" to "0".

At the automatic mode, by setting the bit b4 (an interruption interval control bit of the one-shot timer 5bU) of the pulse output data register to "0", as designated by INT in FIG. 16, by setting the interruption interval of the one-shot timer 5bU to "1" at every two times, the interruption generating interval can be set at every three times.

By setting the bit b5 (an interruption valid output polarity setting bit of the one-shot timer 5bU) of the pulse output data register to "0", interruption of the one-shot timer 5bU can be generated when the content of the U-phase output polarity setting toggle flip-flop 5k is at the "L" level, and by setting to "1",the interruption of the one-shot timer 5bU can be generated when the content of the U-phase output polarity setting toggle flip-flop 5k is at the "H" level.

At the automatic mode, the interruption can not be generated at every interruption of the one-shot timer 5bU.

By repeating such operations, as shown in FIG. 16(h), the U-phase waveform is generated. The #U-phase waveform which is the inverted U-phase waveform is, as shown in FIG. 16(i), just treated as the signal in which the content of the output polarity setting toggle flip-flop 5k is inverted from the case of U-phase waveform, and the content of operation is similar to the case of generating the U-phase waveform. In such a manner, the waveform, in which the "L" levels of the U-phase waveform output and the inverted phase #U-phase waveform do not overlap, is outputted from the terminals P5$_5$ and P5$_4$. The "L" level width can also be made variable when the values of the one-shot timer 5bU and the period setting timer 5a are changed and set.

As to the V-phase and W-phase and their inverted #V-phase and #W-phase, similar operations are respectively conducted by the one-shot timers 5bV, 5bW corresponding thereto, to generate the waveforms.

Though the aforementioned description is for the generating example of the three-phase waveform by the triangle wave modulation (also referred to as the double-edge modulation), generation of the three-phase waveform by the saw-tooth wave modulation (also referred to as the single-edge modulation) can be realized by fixing starting levels of the respective phases.

When the bit b5, bit b6 and bit b7 ("H" output polarity setting buffers of the U, V and W-phases) of the pulse output data register are set to "1", respective output levels of the U-phase V-phase and W-phase can be fixed to "H" regardless of the timer, output polarity setting buffer and the automatic mode type. The three-phase waveforms (U-phase, V-phase, W-phase) and their inverted waveforms (#U-phase, #V-phase, #W-phase) thus generated are outputted from respective ports by setting the waveform output control bit (bit b7) of the waveform output mode register to "1". When this bit is set to "0", the ports are in the floating state. Besides setting this bit to "0" by the instruction, by inputting the falling edge to the external interruption #INTo input terminal, or inputting a reset signal to the Rset input terminal to reset, the bit can be made "0".

Next, an example of conducting a conventional U-phase waveform output by the microcomputer with built-in motor control circuit of the present invention is described.

When "0" is written into the bit b1 of the U-phase output polarity setting buffer and the one-shot timer 5bU is operated, a three-phase waveform output mode is operated.

When the counter content of the one-shot timer 5bU becomes "0000H", the content of the reload register 1 5c of the one-shot timer 5bU is transferred the one-shot timer 5bU, which starts the one-shot pulse output.

At this time point, the content of the U-phase output polarity setting buffer (in this case "0") is set in the output polarity setting toggle flip-flop 5k.

When the one-shot pulse output of the one-shot timer 5bU is finished, simultaneously with the content of the output polarity setting toggle flip-flop 5k inverting to "1" from "0", a one-shot pulse of the 8-bit short-circuit check time setting timer 5m which sets time, in which the "L" levels of the U-phase waveform and its inverted #U-phase waveform do not overlap, is outputted.

The U-phase waveform output which is started from the "H" level keeps the "H" level till the one-shot pulse output of the short-circuit check time setting timer 5m is finished, even when the content of the output polarity setting toggle flip-flop 5k is inverted to "1" from "0" by the one-shot pulse output of the one-shot timer 5bU.

When the one-shot pulse output of the short-circuit check time setting timer 5m is finished, the output "1" of the output polarity setting toggle flip-flop 5k already inverted becomes valid, and the U-phase waveform changes to the "L" level.

Next, "1" is written into the bit b1 of the U-phase output polarity setting buffer before the counter content of the one-shot timer 5bU becomes "0000H" again. Thereafter, when the counter content of the one-shot timer 5bU becomes "0000H", the content of the reload register 1 of the one-shot timer 5bU is transferred to the one-shot timer 5bU, and the one-shot pulse output of the one-shot timer 5bU is started.

Simultaneously, "1" written into the U-phase polarity setting buffer is set in the output polarity setting toggle flip-flop 5k, and the U-phase waveform output remains at the "L" level.

When the one-shot pulse output of the one-shot timer 5bU is finished, simultaneously with the content of the output polarity setting toggle flip-flop 5k inverting to "0" from "1", the one-shot pulse output of the short-circuit check time setting timer 5m is started.

When the content of the output polarity setting toggle flip-flop 5k changes to "0" from "1", the output level of the U-phase waveform is changed to "H" from "L", without waiting the end of one-shot pulse output of the short-circuit check time setting timer 5m.

Figure 17:
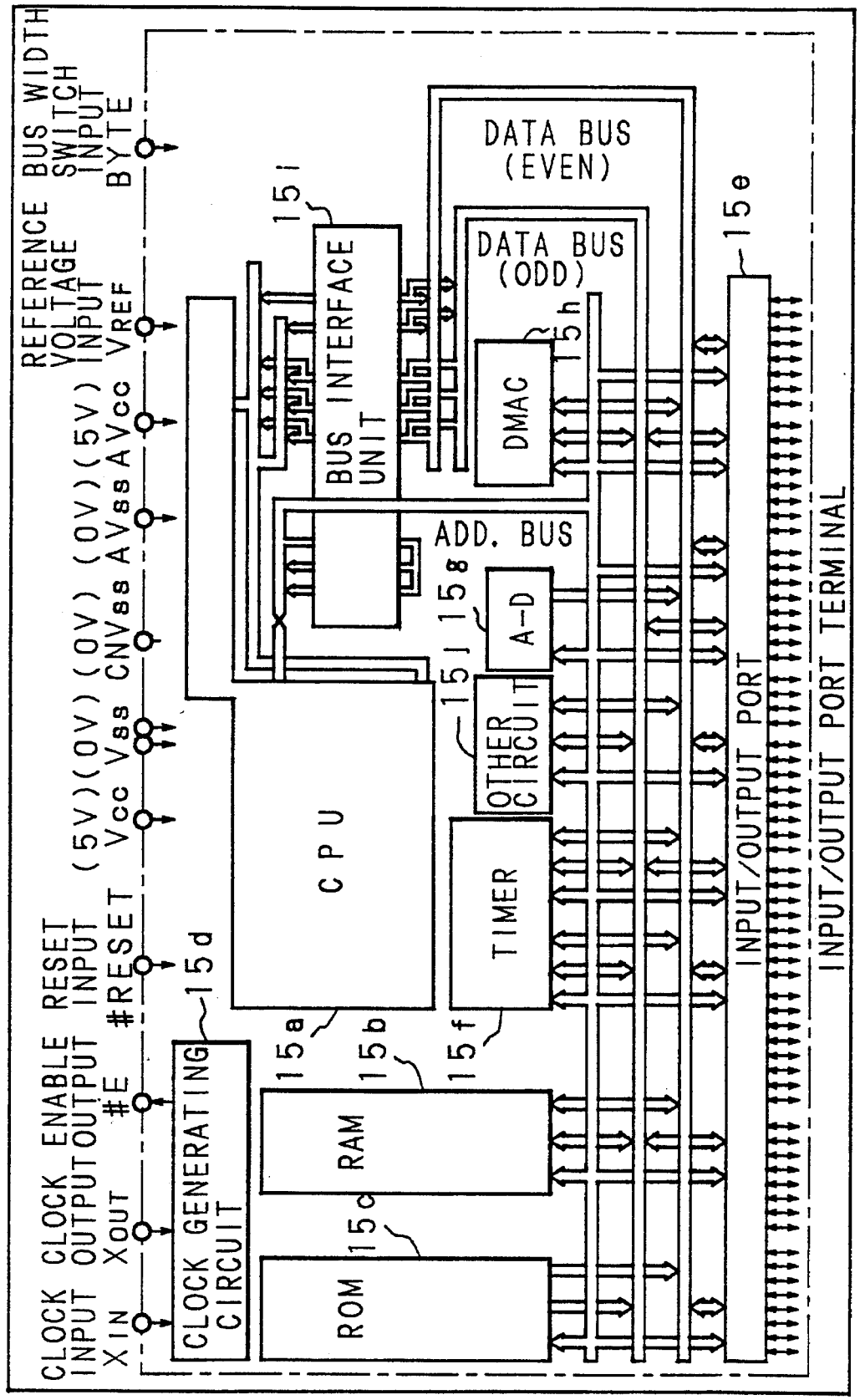
FIG. 17 is a block diagram showing a specific layout of a microcomputer with built-in motor control circuit of the present invention.

FIG. 17 is a block diagram showing a specific layout of the microcomputer with built-in motor control circuit of the present invention.

In FIG. 17, symbol 15a designates a CPU (central processing unit), symbol 15b designates a RAM, symbol 15c designates a ROM, symbol 15d designates an oscillator, symbol 15e designates a general purpose port, symbol 15f designates a timer unit, symbol 15g designates an A/D converter, symbol 15h designates a DMAC (direct memory access controller), symbol 15i designates a bus interface unit and symbol 15j designates other peripheral circuits. There devices are formed on a same chip, constituting a one-chip microcomputer.

In the aforementioned embodiment, though data (timer data, start level set data etc.) were set by interruption of the CPU, hereupon, the microcomputer with built-in motor control circuit of the present invention is constituted by adding the DMAC to the aforementioned embodiment.

In the case of setting the data (timer data, start level set data etc.) by interruption of the CPU as the conventional example, it is unavoidable that the shorter the period of the period setting timer 5a the larger the load of the CPU for setting the data. In order to avoid such a situation, it is constituted such that data settings are transferred to timer registers from registers or certain memory addresses, by a trigger signal of the period setting timer 5a or trigger signals of the one-shot timers 5bU, 5bV, 5bW for the U-phase, V-phase and W-phase using the DMAC.

Figure 1:
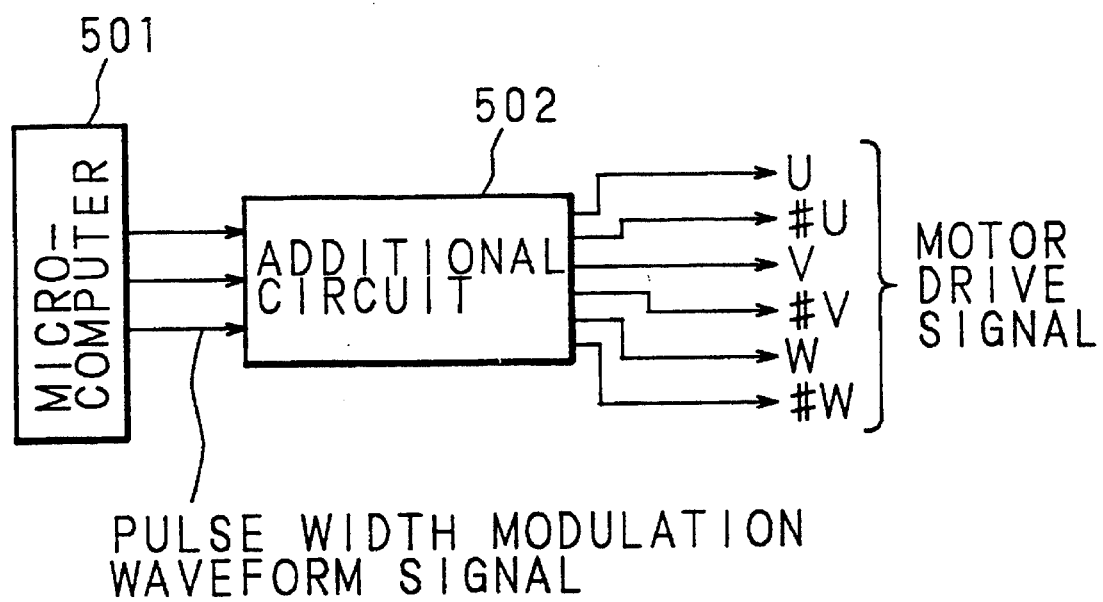
FIG. 1 is a schematic view showing a configuration in the case of controlling a conventional three-phase inverter motor by utilizing a microcomputer.
Figure 2:
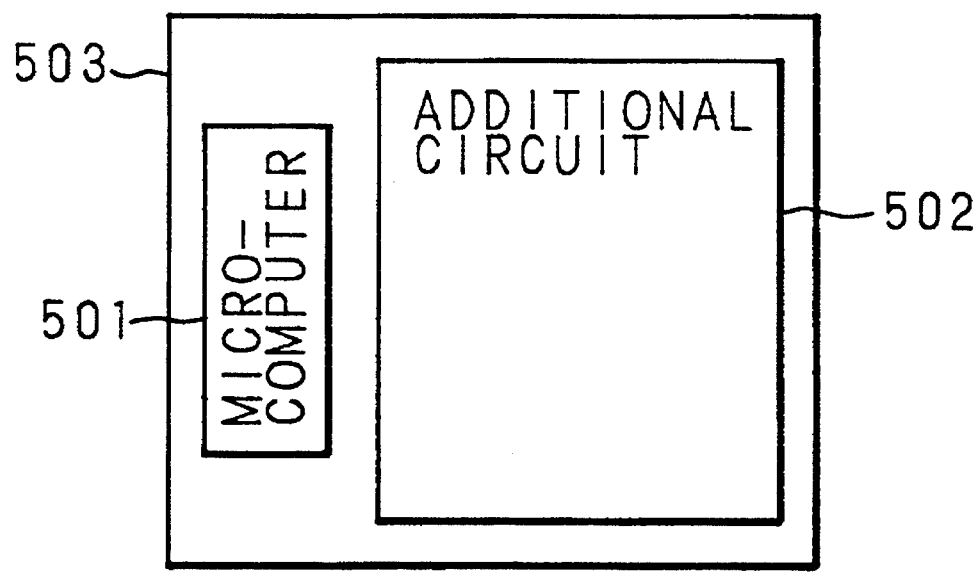
FIG. 2 is a schematic view showing a practical configuration in the case of controlling a conventional three-phase inverter motor by utilizing a microcomputer.
Figure 3:
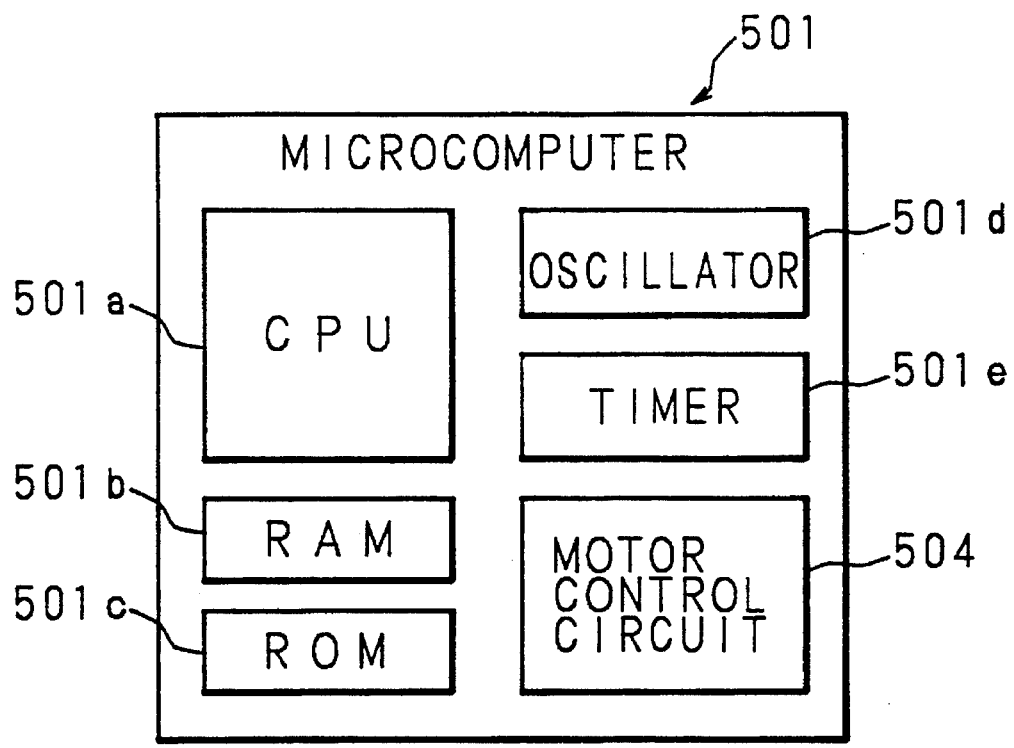
FIG. 3 is a block diagram showing a configuration of the invention disclosed in the U.S. Pat. No. 5,013,985 (Japanese Patent Application Laid-Open No. 3-70475 (1991)) as a conventional example.
Figure 4:
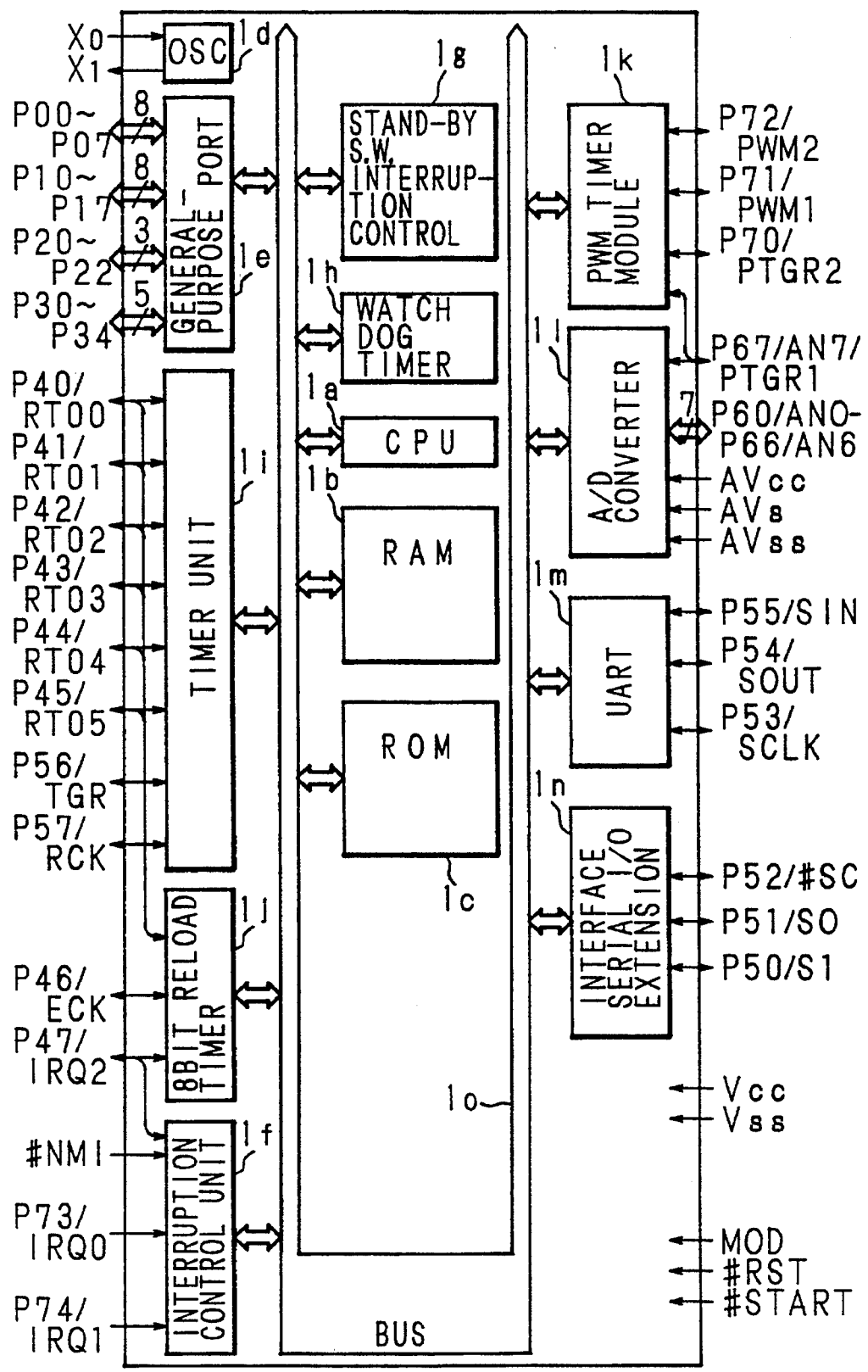
FIG. 4 is a block diagram showing a configuration of a microcomputer as a conventional example.
Figure 5:
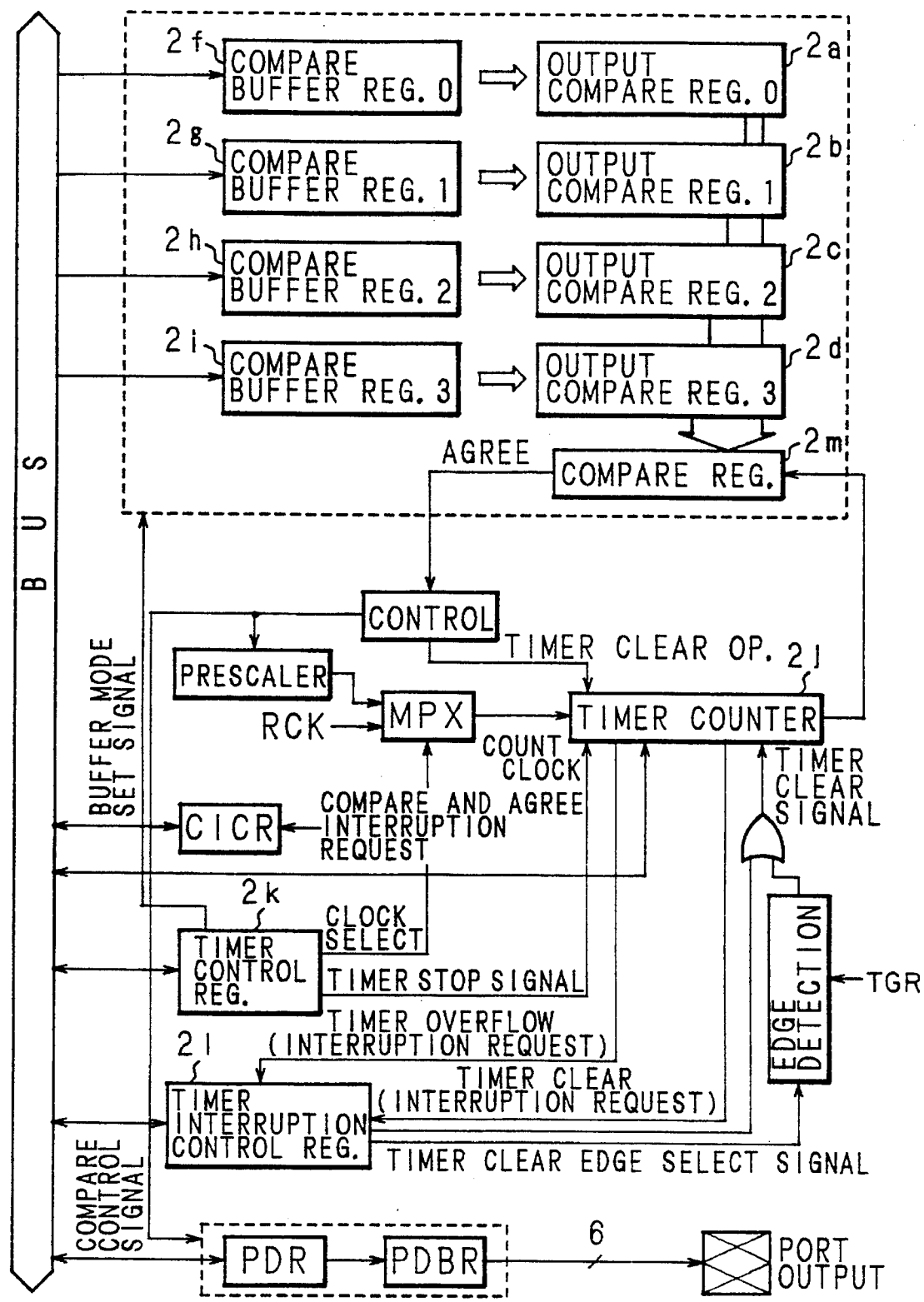
FIG. 5 is a block diagram showing a configuration of a timer unit in FIG. 4.
Figure 6:
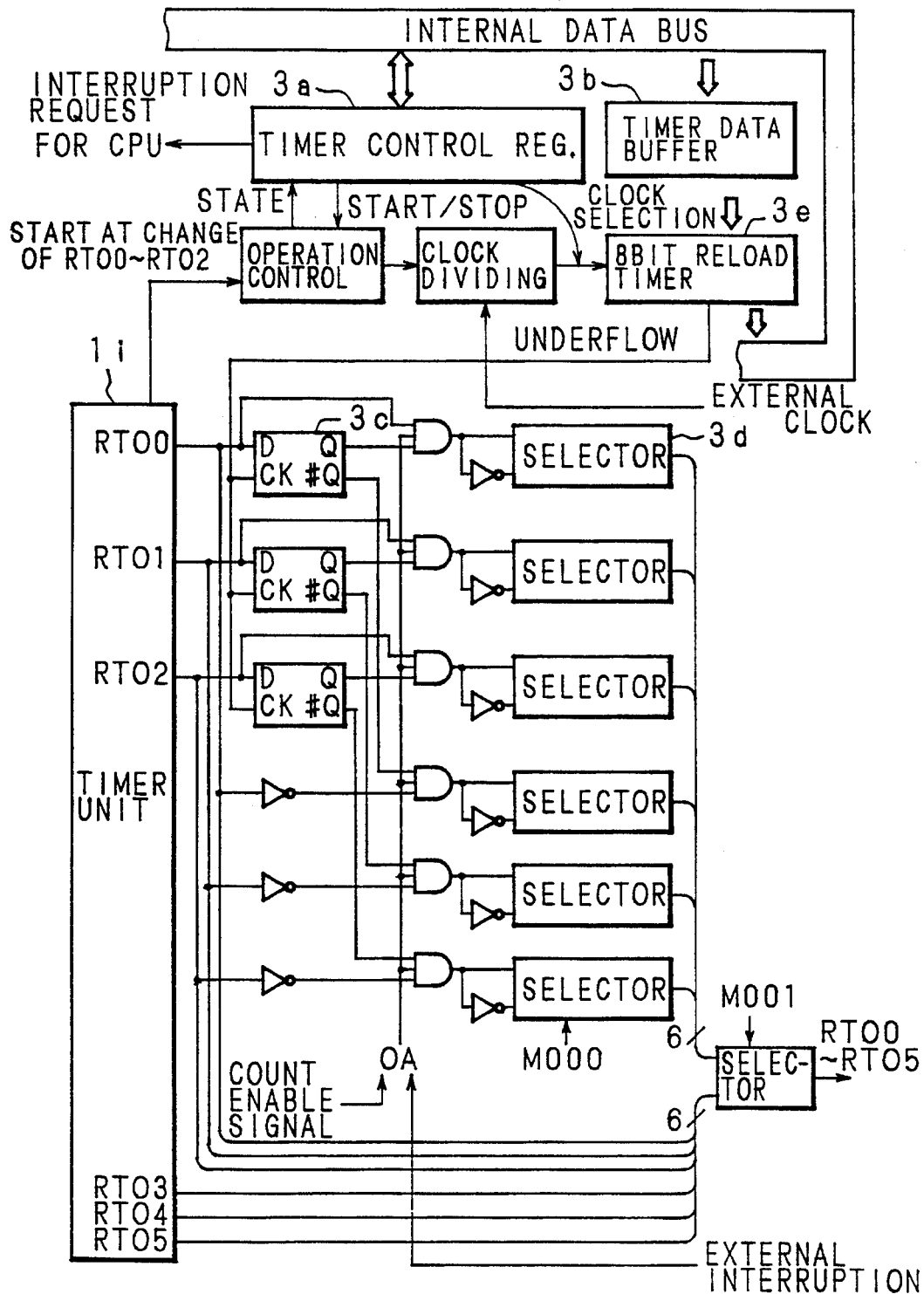
FIG. 6 is a block diagram showing a configuration of an 8-bit reload timer in FIG. 4.
Figure 7:
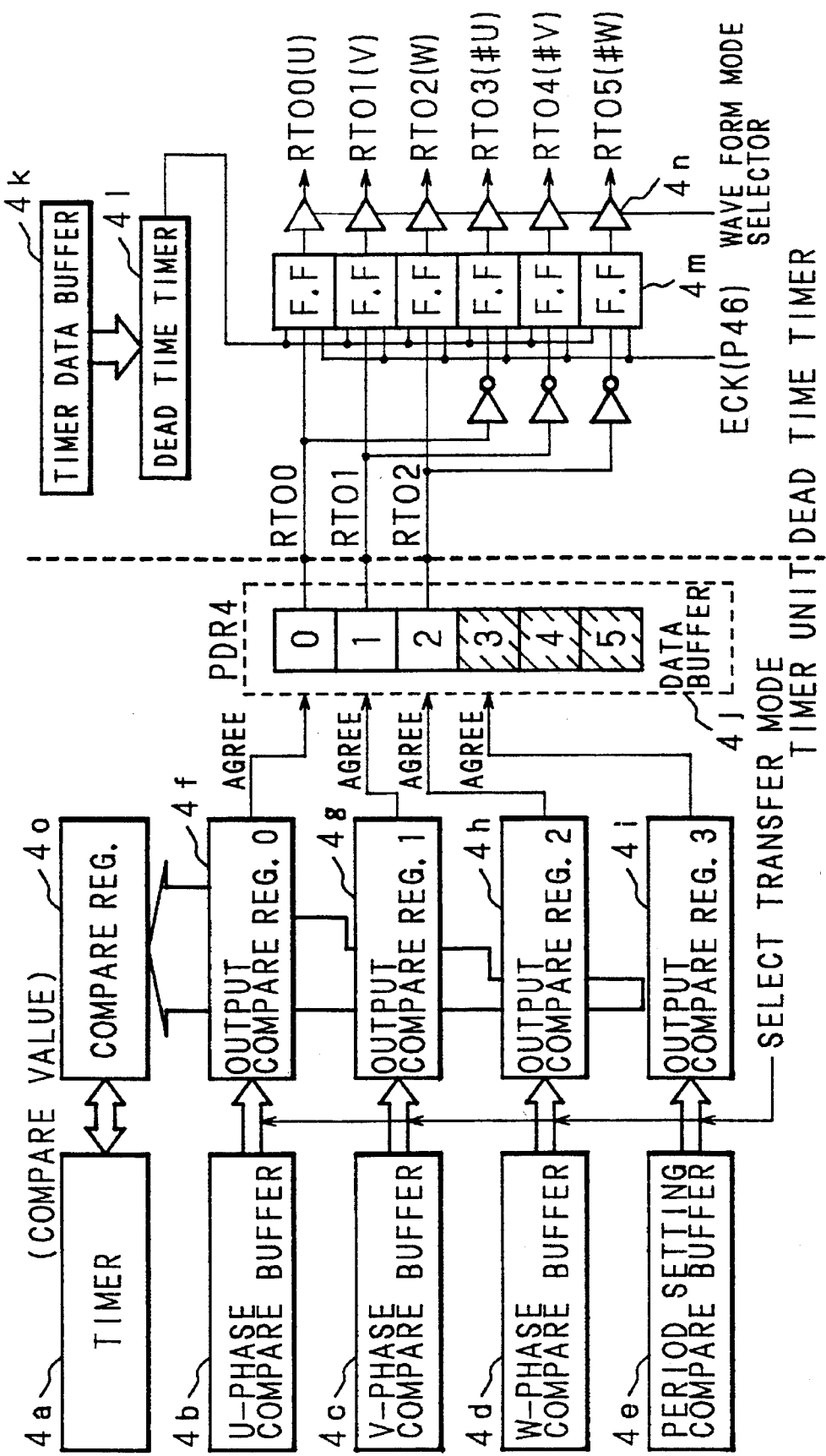
FIG. 7 is a block diagram in which a dead time timer shown in FIG. 6 and a timer unit shown in FIG. 5 are combined.
Figure 8:
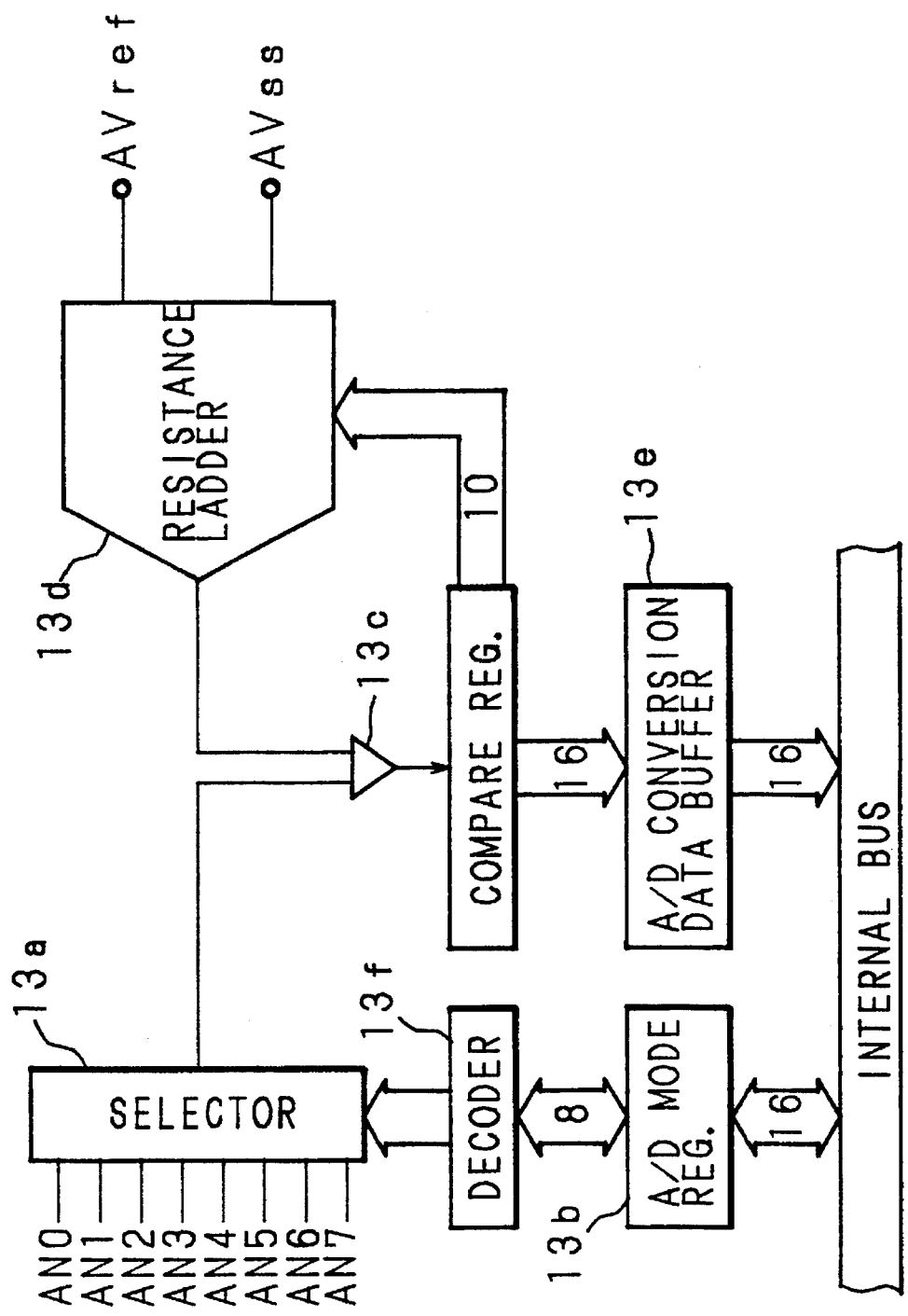
FIG. 8 is a block diagram showing a configuration of an A/D converter of a conventional design as implemented in the present invention microcomputer with built-in motor control circuit.
Figure 9:
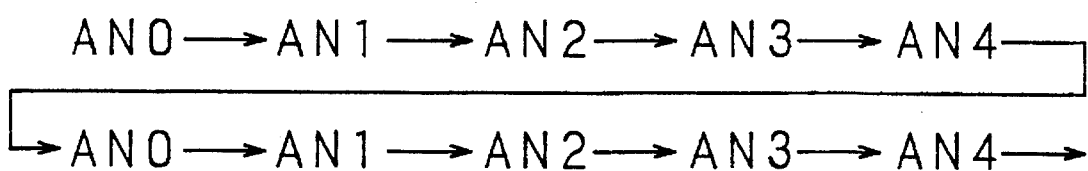
FIG. 9 is a schematic diagram showing a transition of sampling period of a conventional A/D converter.

FIG. 8 is a block diagram showing an example of configuration of the A/D converter of the microcomputer with built-in motor control circuit of the present invention, which is, basically, constituted in the same way as the conventional example.

In FIG. 8, symbol 13a designates a selector, symbol 13b designates an A/D mode register, symbol 13c designates a comparator, symbol 13d designates a resistance ladder, symbol 13e designates an A/D conversion data buffer and symbol 13f designates a decoder.

In this embodiment, eight input terminals from AN0 to AN7 are included in the selector 13a, and analog signals inputted to the input terminals AN0 to AN7 of the selector 13a are selected by the decoder 13f at the sampling period set in the A/D mode register 13b. A/D conversion is conducted by comparing the selected analog signal and a voltage value generated in the resistance ladder 13d by the comparator 13c.

Now, in the A/D converter used in the microcomputer with built-in motor control circuit of the present invention, the selector 13a and the decoder 13f are respectively improved such that, the sampling period can be divided into two kinds responsive to necessary frequencies with respect to analog input information.

In the following, the operation of A/D converter is described with reference to a schematic diagrams showing a transition state of the sampling period.

Figure 19:
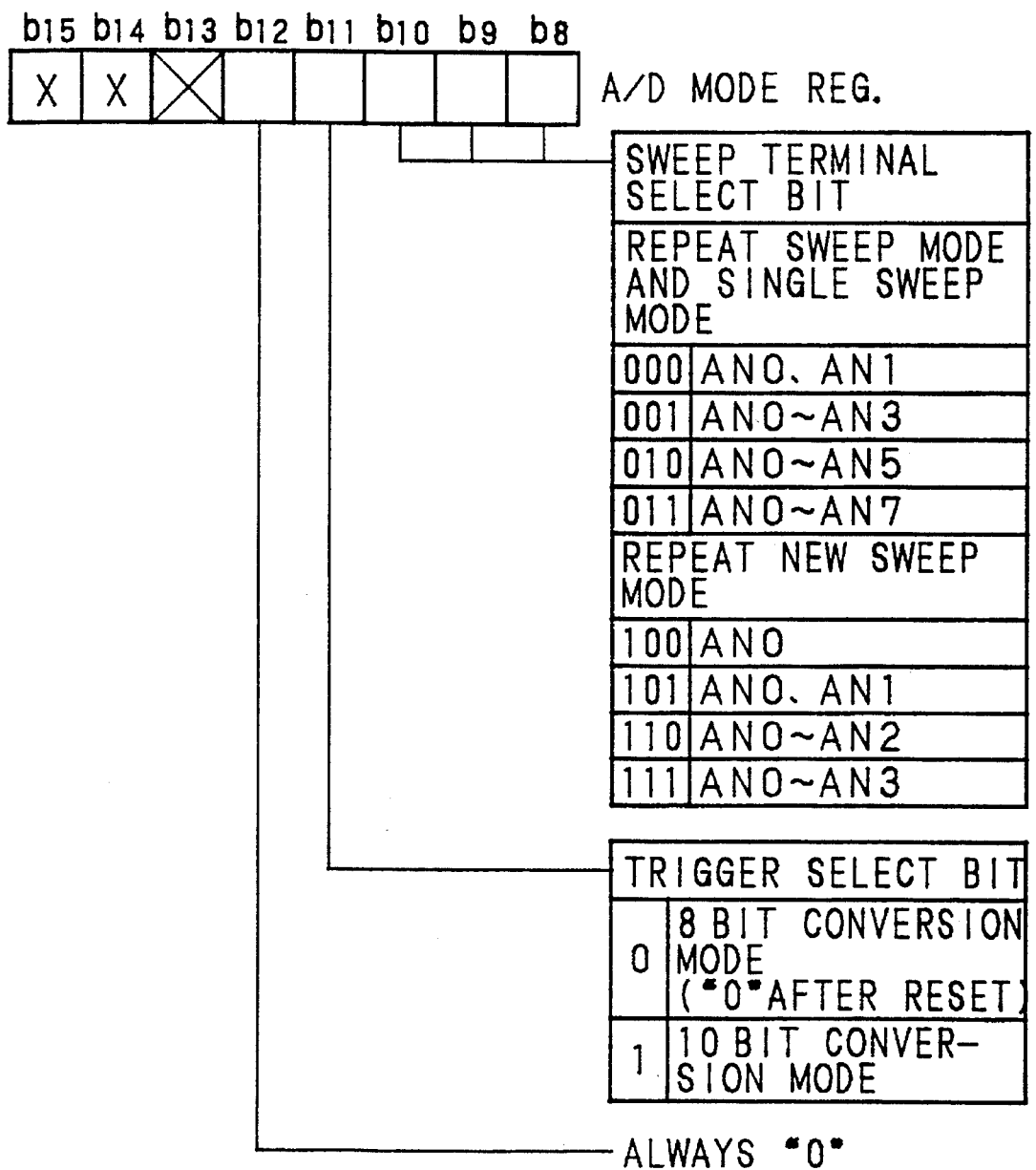
FIG. 19 is a schematic diagram showing a configuration of an A/D mode register and a set state of a sweep terminal setting bit.

Though the decoder 13f selects the analog input terminals AN0 to AN7 at two kinds of sampling periods set by the A/D mode register 13b, as shown in FIG. 18 and FIG. 19, by setting a sweep terminal setting bit of the A/D mode register 13b of 16-bit configuration, a sequence of input terminals to be selected can be set optionally.

Figure 10:
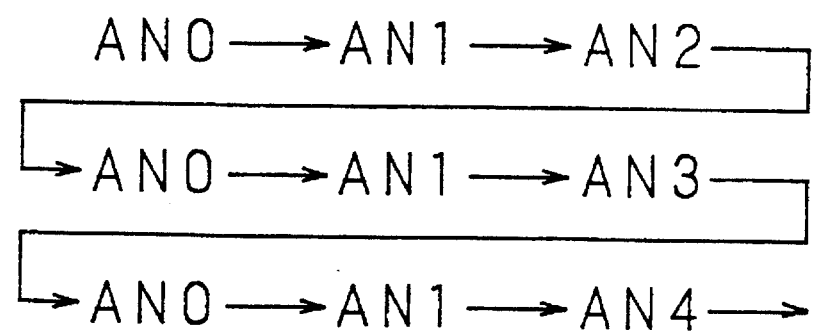
FIG. 10 is a schematic diagram showing a transition of sampling period of an A/D converter of a microcomputer with built-in motor control circuit of the present invention.

For example, assuming that the analog input terminals AN0, AN1 are used frequently and the analog input terminals AN2 to AN4 are used rarely, in the case of A/D conversion of the input signals to the analog input terminals AN0 to AN4, when the sweep terminal setting bits (b8 to b10) are set to "101", as shown in FIG. 10, the A/D conversion is conducted such that, the analog input terminals AN0 to AN4 are sampled in a sequence to sample three inputs in one period, by always sampling the input terminals AN0 and AN1 in each period, and besides sampling the input terminals AN2, AN3 and AN4 once in every one period sequentially.

As mentioned above, in the present invention, since it is constituted such that a start level of the three-phase PWM waveform is inverted automatically by hardwares, it is not necessary to set by the interruption processing of the CPU as in the past. And hence, load of program is reduced.

Also, by constituting such that the CPU interruption can be set at every several times, since the interruption occurs only at the timing when software services are necessary, the time spent for the CPU interruption processing is saved.

Conventionally, since the reload register of the timer was constituted in single step, next period data of the three-phase PWM should be set each time by the CPU interruption processing which occurs at every three-phases PWM period. However, in the present invention, the reload register is constituted in two steps and set data is transferred alternately to the timer from the reload registers, so that the setting times of the timer data are reduced.

Also, in the case of setting data (timer data, start level set data etc.) such as the data read out from a data table or the data calculated by operation and the like at the CPU interruption processing as the prior art, the shorter the period setting timer period, the larger the CPU load for setting the data. However, in the present invention, since the time spent for setting data within the CPU interruption processing is shortened by using the DMAC, the CPU load can be made zero.

Furthermore, since it is constituted such that two kinds of sampling periods of the A/D converter can be set, the A/D conversion processing corresponding to the necessary frequency of analog input information is possible.

In the present invention, by the aforementioned facts, loads of the CPU execution processing can be reduced and the real time control and processing can be realized. In the prior art, in the case of conducting the three-phase PWM waveform output control which is an object of the present invention, as the three-phase PWM frequency becomes higher, the CPU load for setting data of the three-phase PWM becomes considerably high, thus the high frequency three-phase PWM could not be controlled. Also, in the A/D conversion, since the sampling period can not, be divided responsive to necessary frequencies with respect to analog input information, and the sampling time of the A/D conversion was comprehensively long, when A/D conversion values are used in the PWM output data, the data can not be updated in time, but in the present invention, these problems are solved.

While the present embodiment provides for generation of the pulse width modulation output in response to an analog signal supplied from outside the microcomputer with built-in motor control circuit, generation of the pulse width modulation output can be also in response to a digital signal supplied from outside the microcomputer with built-in motor control circuit or processing of a stored program.

Figure 20:
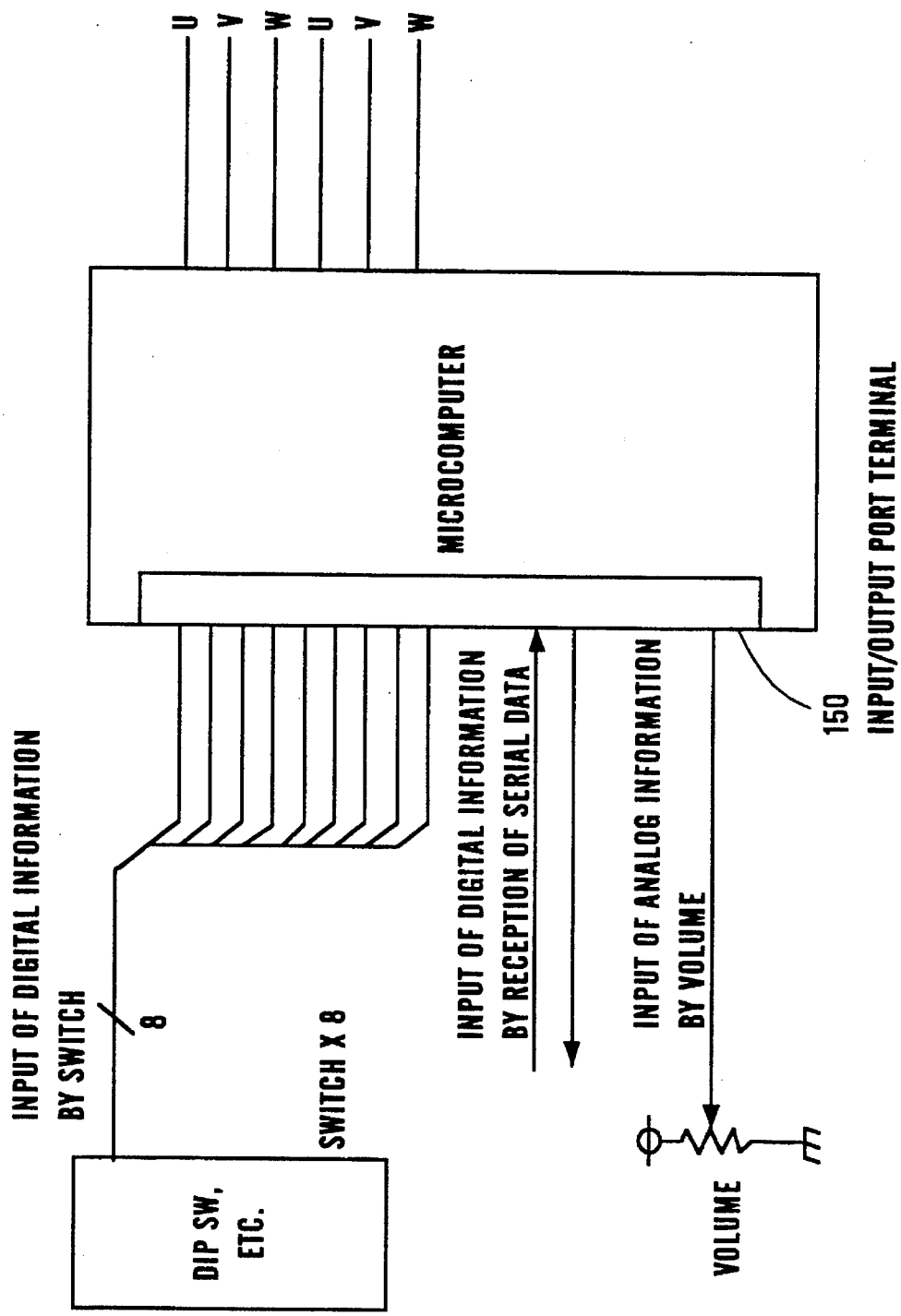
FIG. 20 is a block diagram showing different ways of inputting data to the microcomputer of FIG. 17.

Referring to FIG. 20, when a digital signal is supplied from outside the microcomputer with built-in motor control circuit, a digital signal is input from 15e (Input/Output Port Terminal) of FIG. 17. The digital signal can be provided by a set value (8-bit binary data, etc.) of a switch or the like, connected to the outside. The digital signal is stored in a port data register and converted into pulse width modulation output data. Alternately, the digital signal can be input by serial communication, stored in a serial data register, and converted into pulse width modulation output data. In FIG. 20, U, V, W and /U, /V, /W are the three-phase inverter waveform for control of driver a three-phase inverter motor.

Figure 21:
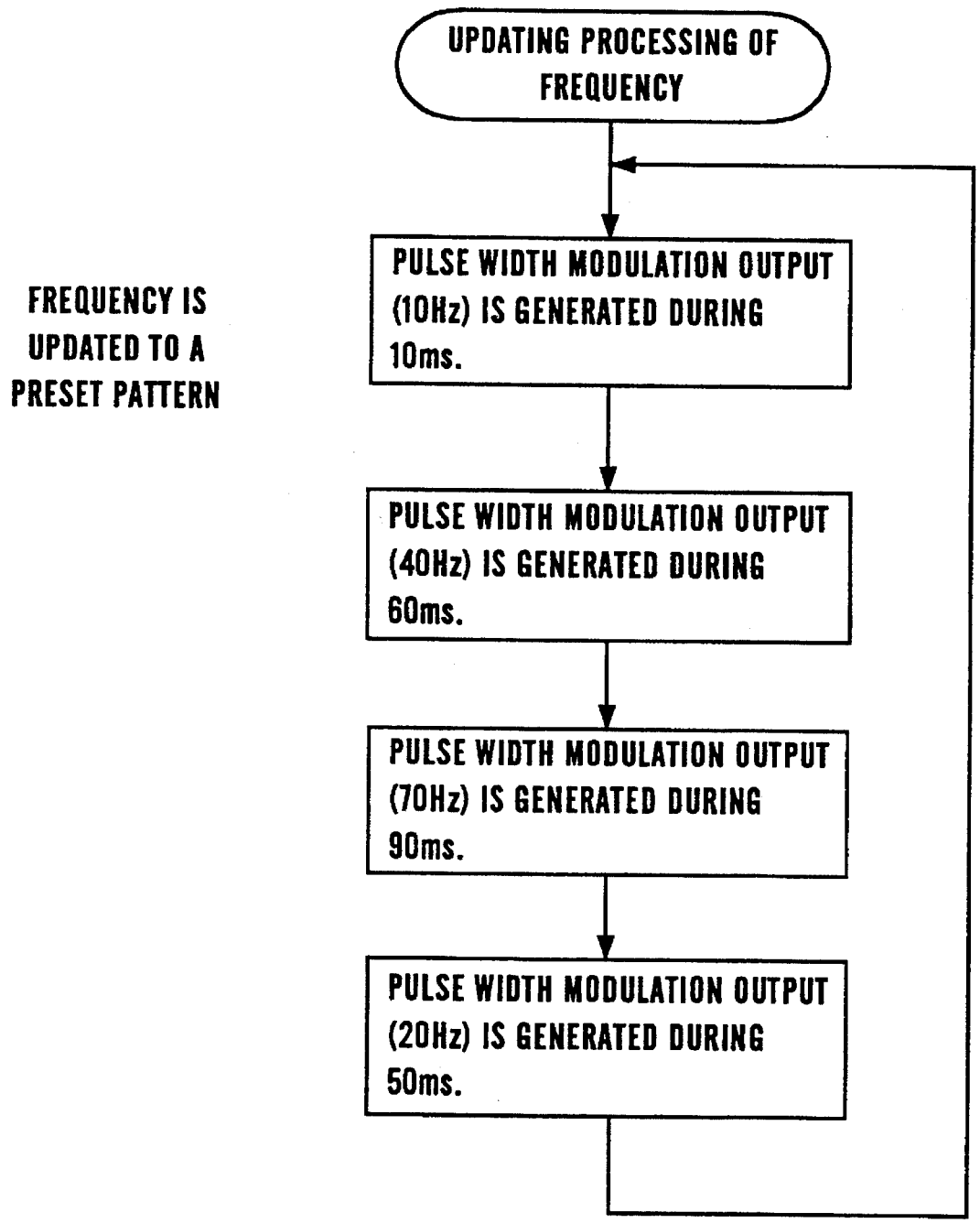
FIG. 21 is a flow diagram of program processing for generation of a pulse width modulation output.

An example of processing a stored program by the CPU of FIG. 17 for generation of the pulse width modulation output is depicted in FIG. 21. A preset pattern of pulse width modulation output is described in the program, and pulse width modulation output is generated responsive to execution of the program.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such meets and bounds thereof are therefore intended to be embraced by the claims.

What is claimed is:

1. A microcomputer with a built-in motor control circuit including, a central processing unit and clock generating means for generating a clock signal, and converting a pulse width modulation output generated responsive to one of (i) an analog signal given from the outside, (ii) a digital signal given from the outside, and (iii) processing of a stored program, into an inverter output waveform to generate a three-phase signal for controlling a three-phase inverter motor, comprising:

a pulse width modulation output generating circuit having three three-phase inverter waveform generating timers which generate output pulses on the bases of a rising edge pulse which is in synchronism with the clock signal, and a start level setting circuit which automatically inverts start levels of said three-phase inverter waveform generating timers at elapse of each period, or sets them according to a preset pattern; and a timer data setting circuit having two registers for setting time count values of said three-phase inverter waveform generating timers, and setting set values of the registers alternately in said three-phase inverter waveform generating timers.

2. A microcomputer with a built-in motor control circuit as set forth in claim 1, further comprising a direct memory access controller, wherein data to be set in said three-phase inverter waveform generating timers are transferred to said two registers by using the direct memory access controller.

3. A microcomputer with a built-in motor control circuit including, a central processing unit and clock generating means for generating a clock signal, and converting a pulse width modulation output generated responsive to one of (i) an analog signal given from the outside, (ii) a digital signal given from the outside, and (iii) processing of a stored program, into an inverter output waveform to generate a three-phase signal for controlling three-phase inverter motor, comprising:

a pulse width modulation output generating circuit having three three-phase inverter waveform generating timers which generate output pulses on the bases of a rising edge pulse which is in synchronism with the clock signal, and a start level setting circuit which automatically inverts start levels of said three-phase inverter waveform generating timers at elapse of each period, or sets them according to a preset pattern;

a timer data setting circuit having two registers for setting time count values of said three-phase inverter waveform generating timers, and setting set values of the registers alternately in said three-phase inverter waveform generating timers, and an interruption processing circuit, which generates an interruption processing timing for setting values from said central processing unit in said two registers of said timer data setting circuit, at the time point where time counting of said three-phase inverter waveform generating timers are finished several times.

4. A microcomputer with a built-in motor control circuit as set forth in claim 3, further comprising a direct memory access controller, wherein data to be set in said three-phase inverter waveform generating timers are transferred to said two registers by using the direct memory access controller.

5. A microcomputer with a built-in motor control circuit including, a central processing unit and clock generating means for generating a clock signal, and converting a pulse width modulation output generated responsive to one of (i) an analog signal given from the outside, (ii) a digital signal given from the outside, and (iii) processing of a stored program, into an inverter output waveform to generate a three-phase signal for controlling a three-phase inverter motor, comprising:

a pulse width modulation output generating circuit having three three-phase inverter waveform generating timers which generate output pulses on the bases of a rising edge pulse which is in synchronism with the clock signal, and a start level setting circuit which automatically inverts start levels of said three-phase inverter waveform generating timers at elapse of each period, or sets them according to a preset pattern;

a timer data setting circuit having two registers for setting time count values of said three-phase inverter waveform generating timers, and setting set values of the registers alternately in said three-phase inverter waveform generating timers, an interruption processing circuit, which generates an interruption processing timing for setting values from said central processing unit in said two registers of said timer data setting circuit, at the time point where time counting of said three-phase inverter waveform generating timers are finished several times, and an A/D converter which, when a plural number of analog signals are given from the outside, samples the analog signals at the preset different frequencies respectively to convert them into the digital signals for input.

6. A microcomputer with a built-in motor control circuit as set forth in claim 5, further comprising a direct memory access controller, wherein data to be set in said three-phase inverter waveform generating timers are transferred to said two registers by using the direct memory access controller.

* * * * *